(12) United States Patent
Sugiura et al.

(10) Patent No.: US 12,157,193 B2
(45) Date of Patent: Dec. 3, 2024

(54) MULTI-PRODUCT PALLET DEVICE, CONTROL SYSTEM FOR MULTI-PRODUCT PALLET DEVICE, DISPLACEMENT-RESTRICTING MECHANISM, AND CONFORMING MECHANISM

(71) Applicant: THK CO., LTD., Tokyo (JP)

(72) Inventors: Kayoko Sugiura, Tokyo (JP); Masaki Nagatsuka, Tokyo (JP); Yoshikazu Komiya, Tokyo (JP)

(73) Assignee: THK CO., LTD., Tokyo (JP)

( * ) Notice: Subject to any disclaimer, the term of this patent is extended or adjusted under 35 U.S.C. 154(b) by 275 days.

(21) Appl. No.: 17/601,841

(22) PCT Filed: Apr. 9, 2020

(86) PCT No.: PCT/JP2020/015975
§ 371 (c)(1),
(2) Date: Oct. 6, 2021

(87) PCT Pub. No.: WO2020/209336
PCT Pub. Date: Oct. 15, 2020

(65) Prior Publication Data
US 2022/0193839 A1    Jun. 23, 2022

(30) Foreign Application Priority Data

Apr. 12, 2019  (JP) ................................ 2019-076508
Dec. 26, 2019  (JP) ................................ 2019-237092

(51) Int. Cl.
*B23Q 1/03*    (2006.01)

(52) U.S. Cl.
CPC .................................... *B23Q 1/032* (2013.01)

(58) Field of Classification Search
CPC ........... B25B 1/2421; B25B 5/14; B23Q 1/03; B23Q 1/035; B23Q 1/037; B23Q 3/063
(Continued)

(56) References Cited

U.S. PATENT DOCUMENTS 7,290,761 B2 *  11/2007  Siegel ...................... B25B 1/08
                                                                  269/266
2002/0050672 A1   5/2002  Moncavage
(Continued)

FOREIGN PATENT DOCUMENTS

CN     103707036 A    4/2014
CN     103801793 A    5/2014
(Continued)

OTHER PUBLICATIONS

WO-2017175554 Machine Translation (Year: 2017).*
(Continued)

*Primary Examiner* — Tyrone V Hall, Jr.
*Assistant Examiner* — Alberto Saenz
(74) *Attorney, Agent, or Firm* — WHDA, LLP

(57) ABSTRACT

This multi-product pallet device (1) includes a multi-product pallet (2) deforming a shape thereof in conformity with a shape of a workpiece; and a device main body (3) to which the multi-product pallet is attached and which stores shape restoration data for deforming the multi-product pallet and restores the shape of the multi-product pallet based on the shape restoration data, wherein the multi-product pallet is detachable from the device main body.

4 Claims, 19 Drawing Sheets

(58) Field of Classification Search
USPC .................. 269/266, 269, 289 R; 29/434
See application file for complete search history.

(56) References Cited

U.S. PATENT DOCUMENTS

| | | |
|---|---|---|
| 2005/0269758 A1 | 12/2005 | Sears et al. |
| 2011/0248144 A1 | 10/2011 | Lee |
| 2017/0100839 A1 | 4/2017 | Kai et al. |

FOREIGN PATENT DOCUMENTS

| | | | |
|---|---|---|---|
| CN | 107159913 A | | 9/2017 |
| CN | 107253304 A | | 10/2017 |
| CN | 107263365 A | | 10/2017 |
| CN | 206632712 U | | 11/2017 |
| CN | 107708916 A | | 2/2018 |
| CN | 109366220 A | | 2/2019 |
| CN | 116851933 A | | 10/2023 |
| DE | 10224532 A1 | | 12/2003 |
| DE | 102016205828 A1 | | 10/2017 |
| JP | 56-116908 A | | 9/1981 |
| JP | 60-226966 A | | 11/1985 |
| JP | 3-138098 A | | 6/1991 |
| JP | 5-70839 U | | 9/1993 |
| JP | 7-23152 Y | | 5/1995 |
| JP | 9-287627 A | | 11/1997 |
| JP | 11-201200 A | | 7/1999 |
| JP | 2000-27951 A | | 1/2000 |
| JP | 2002-13506 A | | 1/2002 |
| JP | 2003-1535 A | | 1/2003 |
| JP | 2005-46986 A | | 2/2005 |
| JP | 2005-335037 A | | 12/2005 |
| JP | 2006-097887 A | | 4/2006 |
| JP | 2007-132367 A | | 5/2007 |
| JP | 2012-56050 A | | 3/2012 |
| JP | 4992598 B2 | * | 8/2012 |
| JP | 3184760 U | | 7/2013 |
| JP | 3186759 U | | 10/2013 |
| JP | 3191218 U | | 6/2014 |
| JP | 2017-087388 A | | 5/2017 |
| JP | 2017-187102 A | | 10/2017 |
| TW | 426571 B | | 3/2001 |
| TW | M392885 U | | 11/2010 |
| WO | 2007/010355 A2 | | 1/2007 |
| WO | 2014-059298 A2 | | 4/2014 |
| WO | WO-2017175554 A1 | * | 10/2017 ................ F16B 2/16 |

OTHER PUBLICATIONS

JP2008224025—Machine Translation (Year: 2008).*
Office Action dated Mar. 27, 2023, issued in counterpart CN Application No. 202080027360.4, with English Translation. (16 pages).
Office Action dated Jun. 30, 2023, issued in counterpart to TW application No. 109112118, with English translation of search report. (9 pages).
International Search Report dated Jul. 14, 2020, issued in counterpart International Application No. PCT/ JP2020/015975, with English Translation. (8 pages).
Notice of Allowance dated Oct. 3, 2023, issued in counterpart JP Application No. 2019-237092, with English Translation. (4 pages).
Office Action dated Jun. 6, 2024, issued in counterpart TW Application No. 112140971, with English Translation. (8 pages).
Office Action dated Sep. 17, 2024, issued in counterpart JP Application No. 2023-186588, with English Translation. (12 pages).

* cited by examiner

|  | A | B | C | D | E | F | G | H |
|---|---|---|---|---|---|---|---|---|
| FIRST ROW | 50 | 44 | 38 | 32 | 26 | 32 | 39 | 46 |
| SECOND ROW | 50 | 44 | 38 | 32 | 26 | 32 | 39 | 46 |
| THIRD ROW | 50 | 44 | 38 | 32 | 26 | 32 | 39 | 46 |
| FOURTH ROW | 50 | 44 | 38 | 32 | 26 | 32 | 39 | 46 |
| FIFTH ROW | 50 | 44 | 38 | 32 | 26 | 32 | 39 | 46 |
| SIXTH ROW | 50 | 44 | 38 | 32 | 26 | 32 | 39 | 46 |
| SEVENTH ROW | 50 | 44 | 38 | 32 | 26 | 32 | 39 | 46 |
| EIGHTTH ROW | 50 | 44 | 38 | 32 | 26 | 32 | 39 | 46 |
| NINTH ROW | 50 | 44 | 38 | 32 | 26 | 32 | 39 | 46 |
| TENTH ROW | 50 | 44 | 38 | 32 | 26 | 32 | 39 | 46 |

MULTI-PRODUCT PALLET DEVICE, CONTROL SYSTEM FOR MULTI-PRODUCT PALLET DEVICE, DISPLACEMENT-RESTRICTING MECHANISM, AND CONFORMING MECHANISM

TECHNICAL FIELD

The present invention relates to a multi-product pallet device, a control system for a multi-product pallet device, a displacement-restricting mechanism, and a conforming mechanism.

Priority is claimed on Japanese Patent Application No. 2019-076508, filed Apr. 12, 2019 and Japanese Patent Application No. 2019-237092, filed Dec. 26, 2019, the contents of which are incorporated herein by reference.

BACKGROUND ART

Patent Literature 1 below describes a workpiece support device that positions, places and supports a workpiece when the workpiece is processed. This workpiece support device is a workpiece support device that can be used for a plurality of types of workpieces having different shapes. The workpiece support device includes a plurality of workpiece supporting means, each of which includes a contact part capable of coming into contact with the workpiece at one end thereof and which support one workpiece in cooperation with each other; a guiding means for guiding the workpiece supporting means movably such that the contact part thereof moves up and down with the movement thereof; a movement restricting means that can restrict downward movement of the contact part at an arbitrary height and can release the restriction; a moving means that automatically operates when disposed at a predetermined position corresponding to each workpiece supporting means and moves the workpiece supporting means such that the contact part thereof is at a height set to correspond to the various workpieces; and a transferring means that can transfer the moving means sequentially and automatically to a predetermined position corresponding to each workpiece supporting means.

According to such a workpiece support device, it is not necessary to create a plurality of jigs according to shapes of multi-product workpieces, and it is not necessary to replace a jig according to a shape of a workpiece. Further, even in a case in which a shape of a workpiece is changed, it is not necessary to process a jig according to the shape of the workpiece, which is particularly advantageous for multi-product and small-quantity production of workpieces.

RELATED ART DOCUMENTS

Patent Documents

[Patent Document 1]
Japanese Unexamined Patent Application, First Publication No. 2003-1535

SUMMARY

Technical Problem

However, in the above-described related art, it is difficult to move the workpiece supporting means as a pallet because the workpiece supporting means that is deformed in conformity with the shape of the workpiece and a device main body that deforms the workpiece supporting means are integrated with each other. Therefore, for example, it is difficult to cause the workpiece to flow on a manufacturing line together with the pallet, and there is room for improvement in usability.

The present invention has been made in view of the above problems, and an object of the present invention is to provide a multi-product pallet device and a control system for a multi-product pallet device that are favorable in usability, and a displacement-restricting mechanism and a conforming mechanism that are suitable for these.

Solution to Problem

To solve the above-described problems, a multi-product pallet device of a first aspect of the present invention includes a multi-product pallet deforming a shape thereof in conformity with a shape of a workpiece; and a device main body which stores shape restoration data for deforming the multi-product pallet and restores the shape of the multi-product pallet based on the shape restoration data, wherein the multi-product pallet is detachable from the device main body.

Further, a control system for a multi-product pallet device of a second aspect of the present invention includes the multi-product pallet device according to the first aspect; and a shape restoration data-generating device which generates the shape restoration data.

Further, a displacement-restricting mechanism of a third aspect of the present invention for restricting displacement of a shaft in an axial direction includes an outer cylinder in which a tapered surface is formed on an inner peripheral surface of the outer cylinder surrounding a peripheral surface of the shaft; an inner cylinder disposed inside the outer cylinder; a rolling body held by the inner cylinder; and a pressing member that presses the rolling body toward the tapered surface through the inner cylinder, wherein the outer cylinder is movable relative to the inner cylinder in the axial direction in a state in which the inner cylinder does not move in the axial direction.

Further, a conforming mechanism of a fourth aspect of the present invention includes a plurality of shafts; and a plurality of displacement-restricting mechanisms which restrict displacement of the plurality of shafts in an axial direction, wherein tip ends of the plurality of shafts are caused to conform to a shape of a workpiece, and wherein the displacement-restricting mechanism according to the third aspect is provided as each displacement-restricting mechanism of the plurality of displacement-restricting mechanisms.

Effect

According to the present invention, it is possible to obtain a multi-product pallet device and a control system for a multi-product pallet device that are favorable in usability, and a displacement-restricting mechanism and a conforming mechanism that are suitable for these.

DETAILED DESCRIPTION

Hereinafter, embodiments of the present invention will be described with reference to the drawings. In the following description, a "multi-product" pallet is a pallet that can be matched to shapes of multi-product workpieces by a shape of the pallet being deformed in conformity with shapes of the workpieces.

First Embodiment

Figure 1:
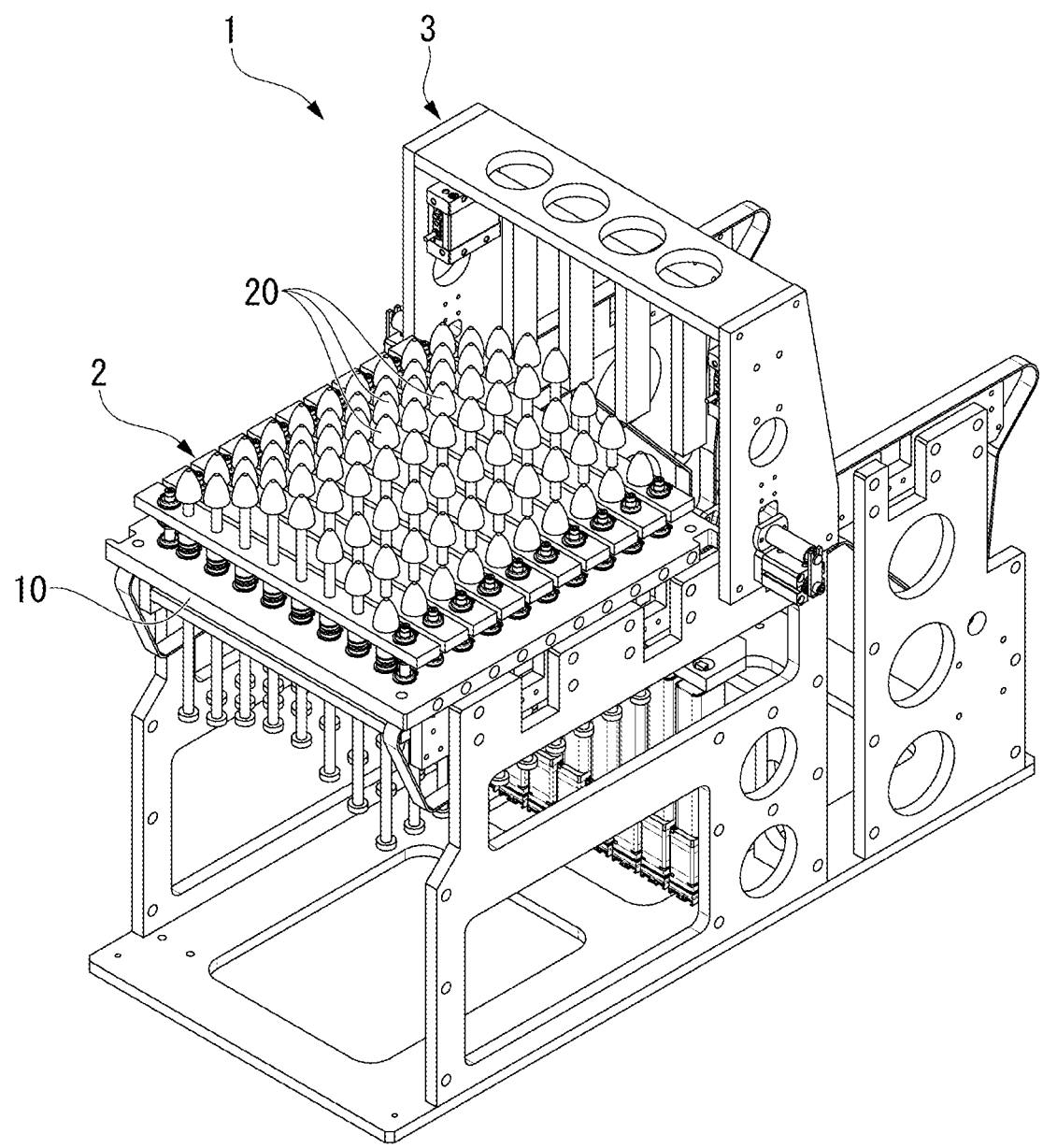
FIG. 1 is an external perspective view showing a multi-product pallet device in a first embodiment of the present invention.

FIG. 1 is an external perspective view showing a multi-product pallet device 1 in a first embodiment of the present invention.

As shown in FIG. 1, the multi-product pallet device 1 has a multi-product pallet 2 (a conforming mechanism) and a device main body 3.

The multi-product pallet 2 mainly includes a pallet main body 10 having a rectangular plate shape in a plan view, and a plurality of workpiece contact parts 20 which are displaceable (movable up and down) with respect to the pallet main body 10. In the device main body 3, the plurality of workpiece contact parts 20 are displaced, and thus a shape of the multi-product pallet 2 is deformed in conformity with a shape of a workpiece (not shown). The multi-product pallet 2 shown in FIG. 1 is an example after deformation.

Figure 2:
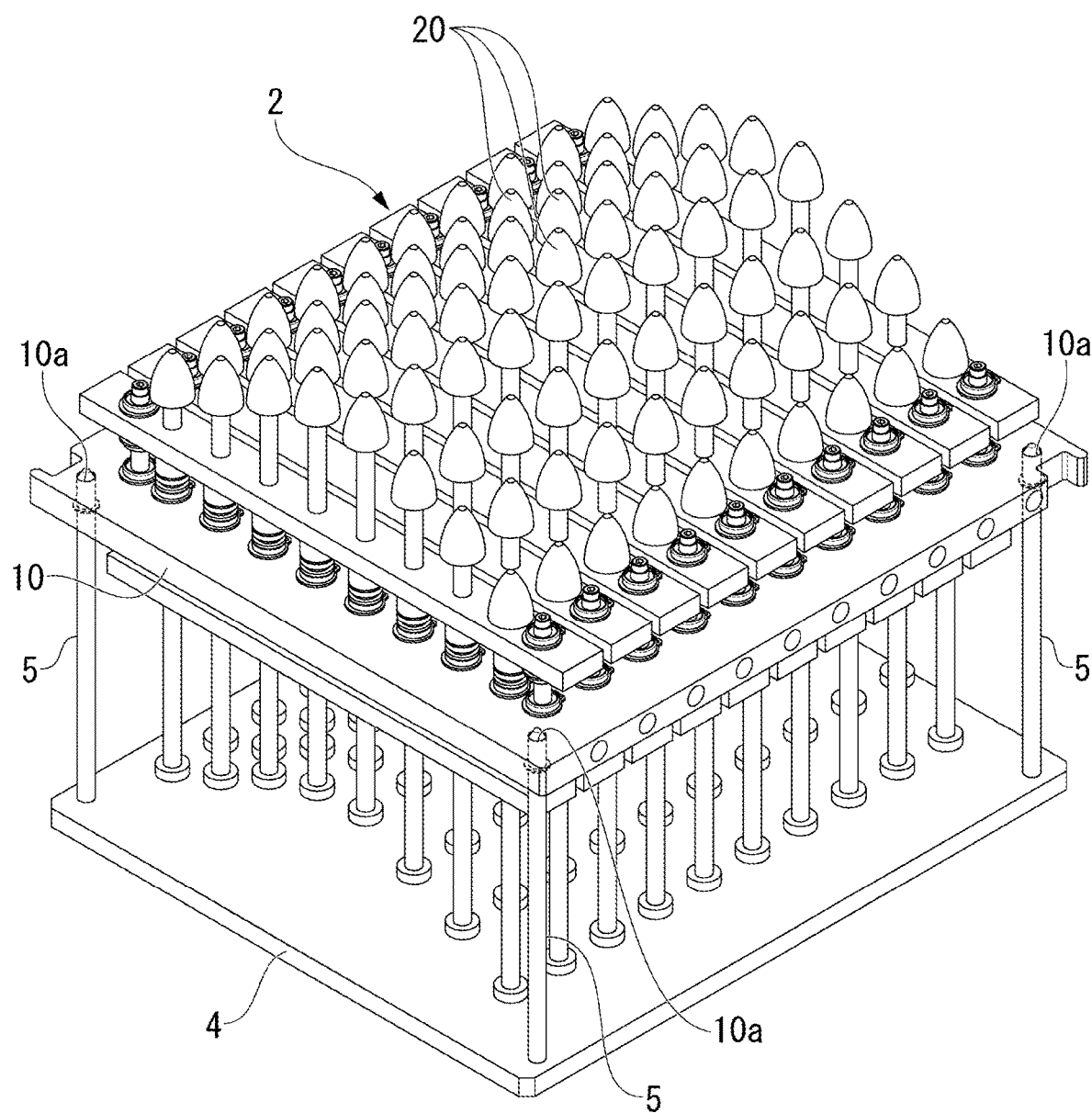
FIG. 2 is an external perspective view showing a state in which a multi-product pallet is detached from a device main body in the first embodiment of the present invention.

FIG. 2 is an external perspective view showing a state in which the multi-product pallet 2 is detached from the device main body 3 in the first embodiment of the present invention.

The multi-product pallet 2 can be detached from the device main body 3, and in the example shown in FIG. 2, the multi-product pallet 2 is placed on an auxiliary table 4. That is, the multi-product pallet 2 is provided attachably to and detachably from the device main body 3. The auxiliary table 4 is provided with four support columns 5 that fit into holes 10a formed at four corners of the pallet main body 10 of the multi-product pallet 2.

In a case in which the multi-product pallet 2 is placed on the auxiliary table 4, the support column 5 forms, between the pallet main body 10 and the auxiliary table 4, a space wide enough for a lower end of the workpiece contact part 20 extending downward from the pallet main body 10 (specifically, a lowermost end of the workpiece contact part 20 which is not displaced) not to come into contact with the auxiliary table 4. Here, when the workpiece contact part 20 is at its lowermost position, it may be said that the workpiece contact part 20 is in an initial position (zero displacement), and it may be said that the workpiece contact part 20 is not displaced. By placing the multi-product pallet 2 on the auxiliary table 4 in this way, it is possible to improve support stability of the multi-product pallet 2 after deformation. Therefore, for example, it is easy to cause the multi-product pallet 2 to flow on the manufacturing line together with the workpiece.

Next, a configuration of the multi-product pallet 2 will be described in detail.

Figure 3:
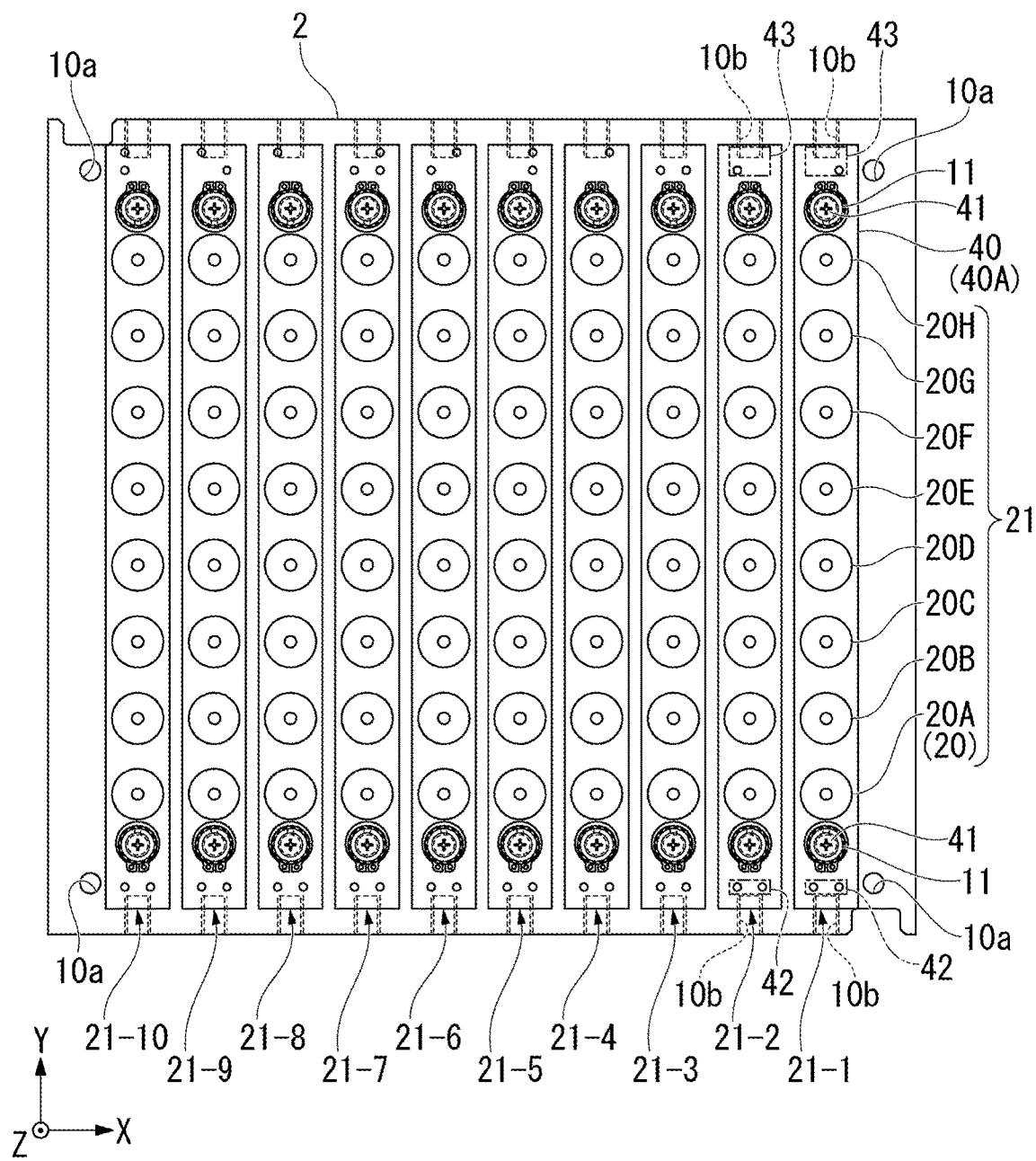
FIG. 3 is a plan view of the multi-product pallet in the first embodiment of the present invention.
Figure 4:
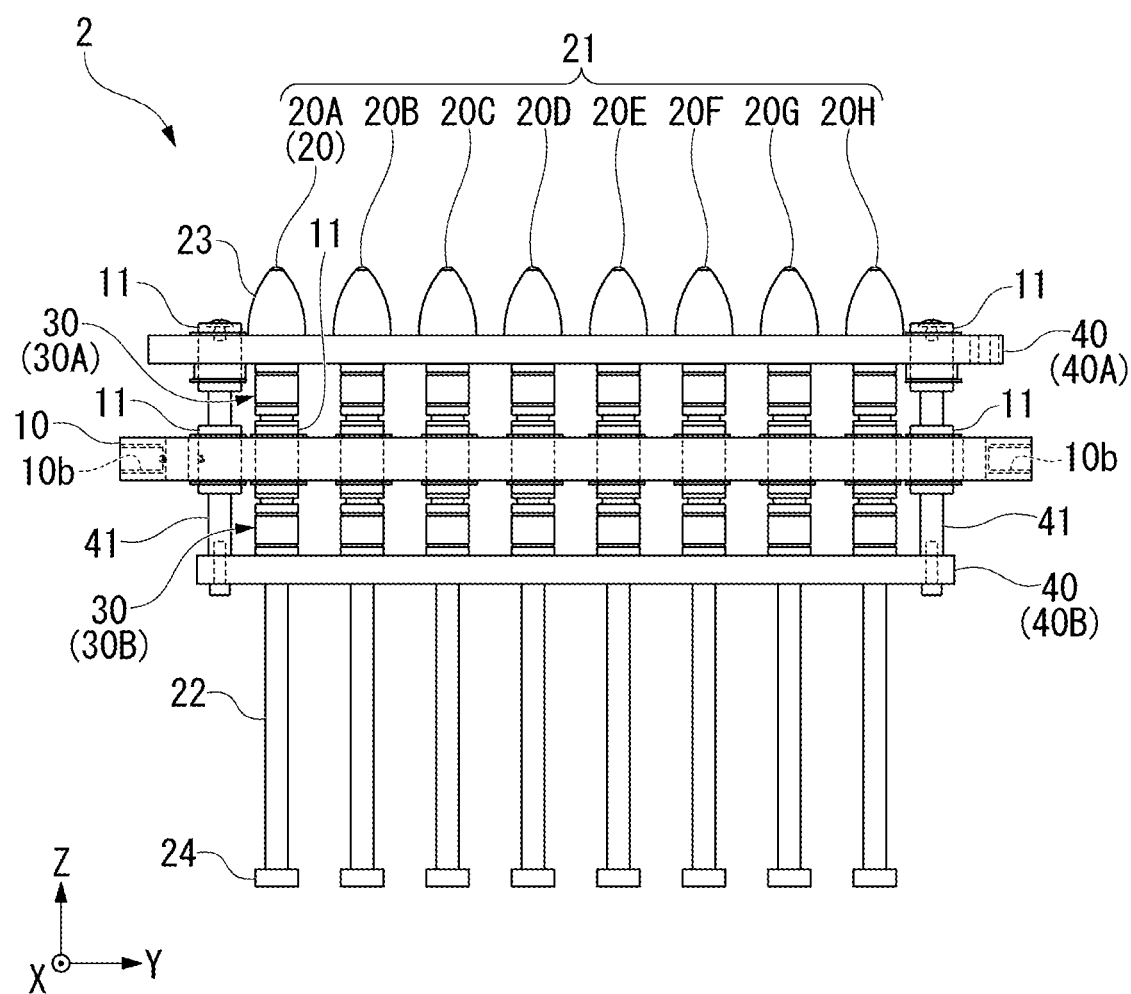
FIG. 4 is a right side view of the multi-product pallet in the first embodiment of the present invention.
Figure 5:
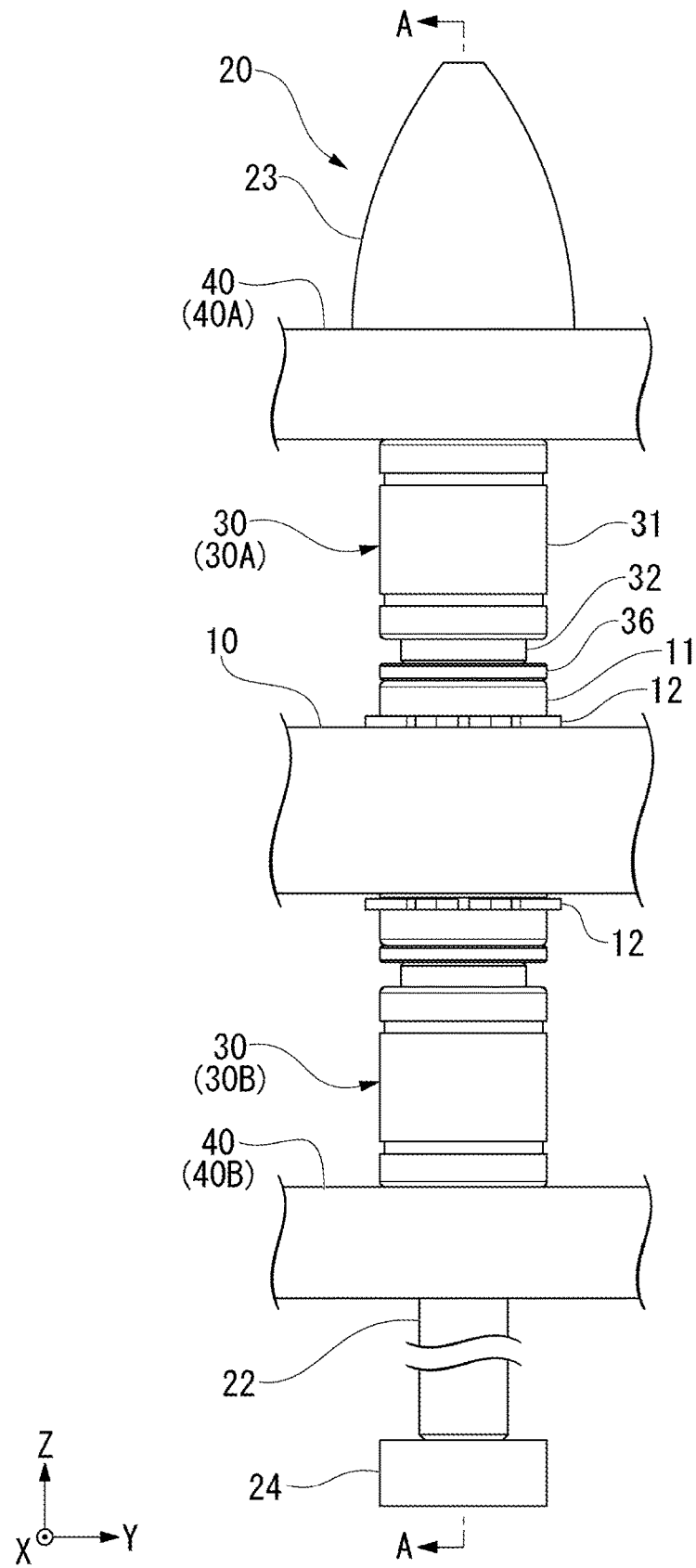
FIG. 5 is an enlarged view of a workpiece contact part in the first embodiment of the present invention.
Figure 6:
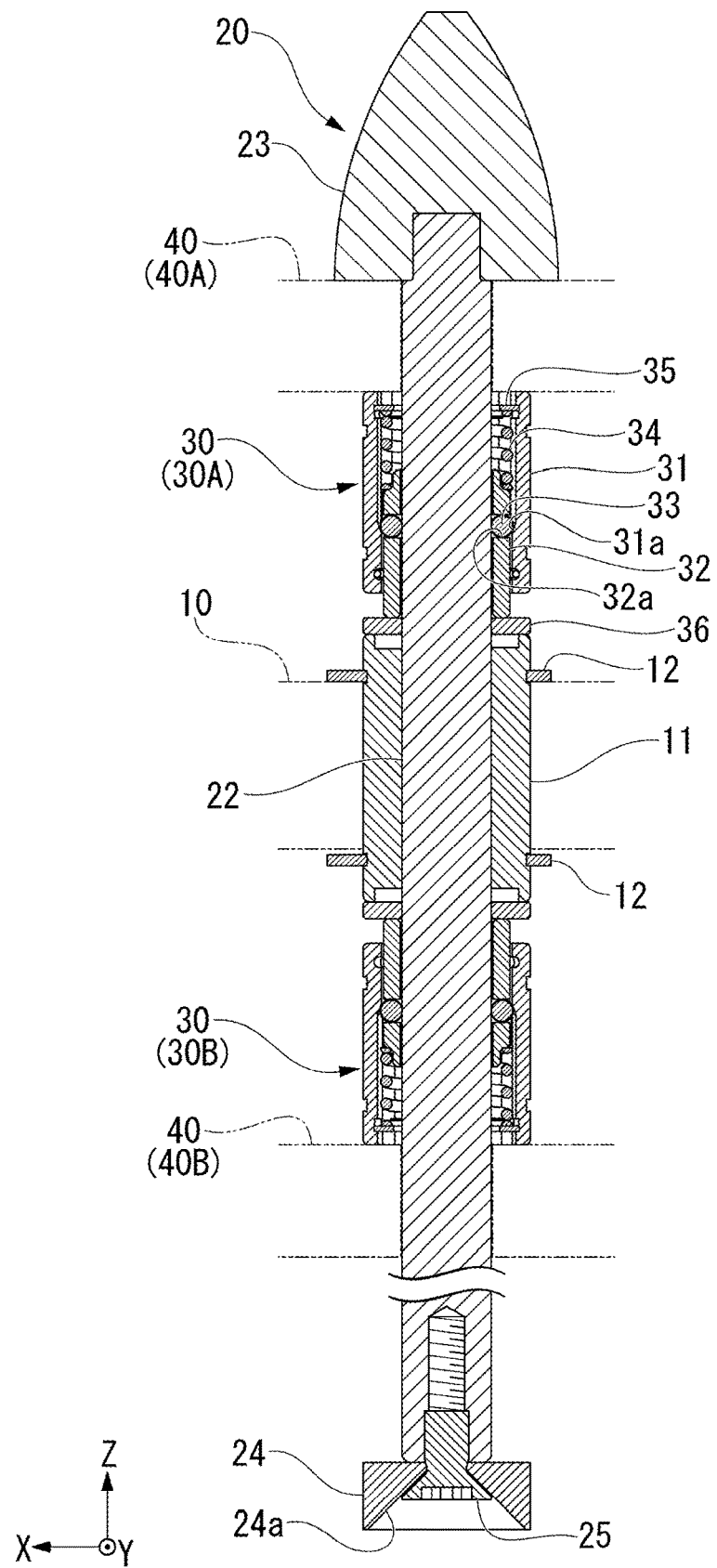
FIG. 6 is a view along line A-A shown in FIG. 5.

FIG. 3 is a plan view of the multi-product pallet 2 in the first embodiment of the present invention. FIG. 4 is a right side view of the multi-product pallet 2 in the first embodiment of the present invention. FIG. 5 is an enlarged view of the workpiece contact part 20 in the first embodiment of the present invention. FIG. 6 is a view along line A-A shown in FIG. 5.

As shown in FIG. 3, the pallet main body 10 is provided with a plurality of workpiece contact rows 21 (workpiece contact rows 21-1 to 21-10) in each of which a plurality of workpiece contact parts 20 (workpiece contact parts 20A to 20H) are arranged in one row.

In the following description, an XYZ Cartesian coordinate system is set, and a positional relationship of members may be described with reference to the XYZ Cartesian coordinate system. An X-axis direction is a direction in which the workpiece contact rows 21-1 to 21-10 are aligned (also referred to as a longitudinal direction of the pallet main body 10), a Y-axis direction is a direction in which the workpiece contact parts 20A to 20H are aligned (also referred to as a width direction of the pallet main body 10), and a Z-axis direction is a displacement direction in which the workpiece contact part 20 is displaced (also referred to as a thickness direction of the pallet main body 10). Further, the Z-axis direction may be referred to as an up-down direction, and the X-axis direction may be referred to as a left-right direction.

As shown in FIG. 3, the workpiece contact parts 20 of the present embodiment are disposed in a matrix of 8×10 (8×10 is an example). The workpiece contact parts 20 are disposed at an equal pitch in the Y-axis direction in which the workpiece contact parts 20A to 20H form a row and are also disposed at an equal pitch in the X-axis direction in which the workpiece contact rows 21-1 to 21-10 form a row. That is, a distance between one workpiece contact part 20 and another workpiece contact part 20 adjacent to the one workpiece contact part 20 in the X-axis direction is equal to a distance between the one workpiece contact part 20 and another workpiece contact part 20 adjacent to the one workpiece contact part 20 in the Y-axis direction.

The pallet main body 10 is formed to be one size larger than the 8×10 disposition area of the workpiece contact parts 20 in a plan view and is formed in a shape of a rectangular plate long in the X-axis direction in the present embodiment. Positioning holes 10b are formed on both side surfaces of the pallet main body 10 in the width direction (the Y-axis direction) at positions corresponding to the workpiece contact rows 21-1 to 21-10. That is, the positioning holes 10b are formed on both side surfaces of the pallet main body 10 at the same pitch as the workpiece contact rows 21 in the longitudinal direction (the X-axis direction).

As shown in FIGS. 5 and 6, the workpiece contact part 20 includes a shaft 22, a tip end portion 23 attached to an upper end of the shaft 22, and a receiving part 24 attached to a lower end of the shaft 22. The shaft 22 extends in the Z-axis direction and is guided to be displaceable in the Z-axis direction by a linear motion guide mechanism 11 attached to the pallet main body 10. The linear motion guide mechanism 11 is attached to the pallet main body 10 to sandwich upper and lower surfaces of the pallet main body 10 with retaining rings 12. The linear motion guide mechanism 11 rolls and guides a peripheral surface of the shaft 22 with a rolling body (not shown). The linear motion guide mechanism 11 may be configured to slide and guide the peripheral surface of the shaft 22 on the inner peripheral surface of a cylindrical body thereof.

The tip end portion 23 is removable from the shaft 22 depending on a type of a workpiece. The tip end portion 23 of the present embodiment is a substantially conical rubber (an elastic body), but it may be a sphere or may be a hard material such as a plastic or metal instead of the elastic body. Further, the tip end portion 23 may be a suction cup or a suction pad capable of sucking the workpiece.

The receiving part 24 is a disk body having a conical counterbore 24a formed on a lower surface thereof and is fixed to the lower end of the shaft 22 through a countersunk screw 25.

Displacement-restricting mechanisms 30 (30A, 30B) for displacing the workpiece contact part 20 in the Z-axis direction are provided above and below the linear motion guide mechanism 11. As shown in FIG. 6, the displacement-restricting mechanism 30 includes an outer ring 31 in which a tapered surface 31a is formed on an inner peripheral surface of the outer ring 31 surrounding the peripheral surface of the shaft 22, an inner ring 32 (a holder) disposed inside the outer ring 31, a rolling body 33 held by the inner ring 32, a spring 34 that presses the rolling body 33 toward the tapered surface 31a in the axial direction of the shaft 22 through the inner ring 32, and a spring receiver 35 that fits to the inner peripheral surface of the outer ring 31 and receives a reaction force due to pressing by the spring 34. As the displacement-restricting mechanism 30, a well-known ratchet mechanism or the like may be employed.

The outer ring 31 and the inner ring 32 are both formed in a cylindrical shape and are combined to be relatively displaceable in the Z-axis direction. The tapered surface 31a of the outer ring 31 is formed such that an inner diameter thereof gradually decreases toward the linear motion guide mechanism 11. An end surface of the inner ring 32 on a side of the linear motion guide mechanism 11 is in contact with the linear motion guide mechanism 11 with a washer 36 interposed therebetween. A plurality of through holes 32a that penetrate the inner ring 32 in a radial direction and hold the rolling body 33 are formed in the inner ring 32 at intervals in a circumferential direction.

The rolling body 33 is disposed to be capable of rolling in each of the plurality of through holes 32a of the inner ring 32. As the rolling body 33, a ball (a sphere), a roller (a circular column), or a gourd-shaped object in which a peripheral surface of the roller is recessed in conformity with the peripheral surface of the shaft 22 can be employed. In this embodiment, a gourd-shaped rolling body 33 that can secure a large contact area (friction area) with the peripheral surface of the shaft 22 is employed.

According to the above configuration, due to the pressing by the spring 34, the rolling body 33 held by the inner ring 32 enters a wedge-shaped space formed between the peripheral surface of the shaft 22 and the tapered surface 31a of the outer ring 31. Then, the rolling body 33 becomes a wedge, and the displacement of the workpiece contact part 20 (the shaft 22) in the Z-axis direction is restricted. The displacement-restricting mechanism 30A disposed above the linear motion guide mechanism 11 restricts vertical downward movement of the workpiece contact part 20. Further, the displacement-restricting mechanism 30B disposed below the linear motion guide mechanism 11 includes a configuration in which the displacement-restricting mechanism 30A is turned upside down and restricts vertical upward movement of the workpiece contact part 20.

In the present embodiment, the above-described displacement-restricting mechanisms 30A and 30B are provided such that the workpiece contact part 20 does not move up and down due to vibration or the like after the multi-product pallet 2 is detached from the device main body 3. However, in a case in which the multi-product pallet device is used in an environment where it is not necessary to consider vibration and the like, at least the displacement-restricting mechanism 30A (which performs restriction of movement in the direction of gravity and restriction of vertical downward movement of the workpiece contact part 20) is preferably included.

As shown in FIGS. 3 and 4, the multi-product pallet 2 has connecting mechanisms 40 (40A, 40B) that connect a plurality of displacement-restricting mechanisms 30 to each other in each workpiece contact row 21. As shown in FIG. 4, the connecting mechanism 40A is disposed above the pallet main body 10 and connects all the displacement-restricting mechanisms 30A of the workpiece contact row 21 to each other. Further, the connecting mechanism 40B is disposed below the pallet main body 10 and connects all the displacement-restricting mechanisms 30B of the workpiece contact row 21 to each other.

The connecting mechanisms 40A and 40B are each formed in the shape of a long plate extending in the width direction (the Y-axis direction) of the pallet main body 10, and both end portions thereof are connected to each other through a shaft 41 to be displaceable in the thickness direction (the Z-axis direction) of the pallet main body 10.

That is, one end of the connecting mechanism 40A and one end of the connecting mechanism 40B are connected to each other by one shaft 41, and the other end of the connecting mechanism 40A and the other end of the connecting mechanism 40B are connected to each other by another shaft 41. The shaft 41 is fixed to the connecting mechanism 40B, extends in the Z-axis direction, and is guided to be displaceable in the Z-axis direction by linear motion guide mechanisms 11 which are attached to the pallet main body 10 and the connecting mechanism 40A (the same configuration as that of the above-described linear motion guide mechanism 11 of the workpiece contact part 20). An upper end of the shaft 41 is provided with a retainer that prevents the shaft 41 from coming out of the linear motion guide mechanism 11.

As shown in FIG. 6, the connecting mechanisms 40A and 40B are in contact with end faces of the outer rings 31 (end faces of the outer rings 31 on the other sides of the pallet main body 10) of the displacement-restricting mechanisms 30A and 30B, and receive the reaction force of the pressing by the spring 34. In this state, displacement of the workpiece contact part 20 (the shaft 22) in both directions in the Z-axis direction is restricted (also referred to as a clamped state). Here, when the connecting mechanisms 40A and 40B are pressed toward the pallet main body 10 against the pressing by the spring 34, the outer ring 31 (the tapered surface 31a) moves toward the pallet main body 10 and the rolling body 33 rolls and comes out of the wedge-shaped space, and displacement restriction by the displacement-restricting mechanisms 30A and 30B in both directions in the Z-axis direction of the workpiece contact part 20 (the shaft 22) is released (also referred to as an unclamped state).

As shown in FIG. 3, a position detection pattern 42 for detecting a position of the workpiece contact row 21 and a row detection pattern 43 for detecting a row number of the workpiece contact row 21 by the device main body 3 (which will be described later) are formed in the connecting mechanism 40A. The position detection pattern 42 is formed by two holes separated in the X-axis direction. The row detection pattern 43 is formed by a combination of four holes (four bits). That is, in the row detection pattern 43, a hole formation pattern varies for each workpiece contact row 21-1 to 21-10.

Next, a configuration of the device main body 3 will be described in detail.

Figure 7:
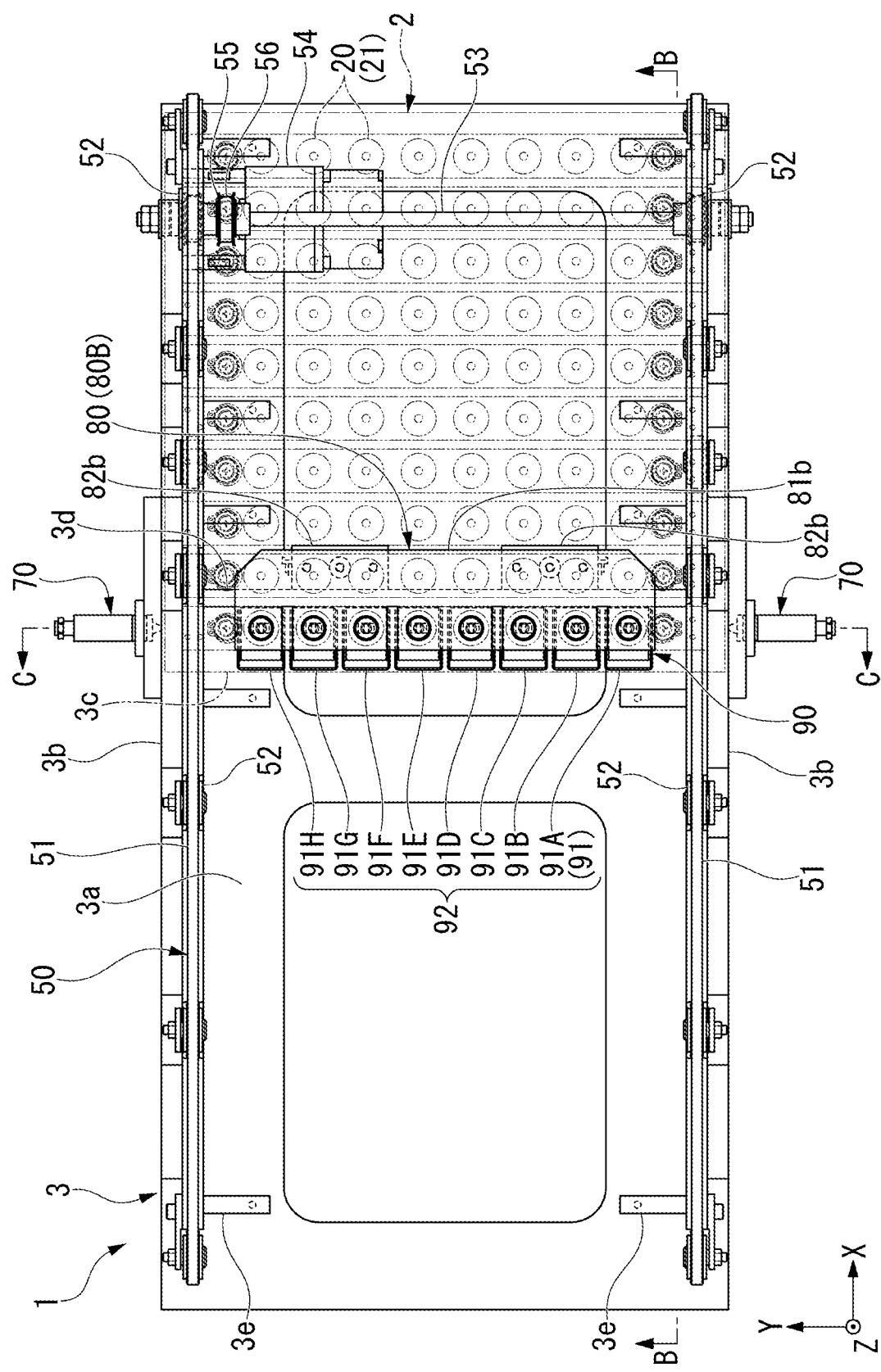
FIG. 7 is a plan view of the device main body in the first embodiment of the present invention.
Figure 8:
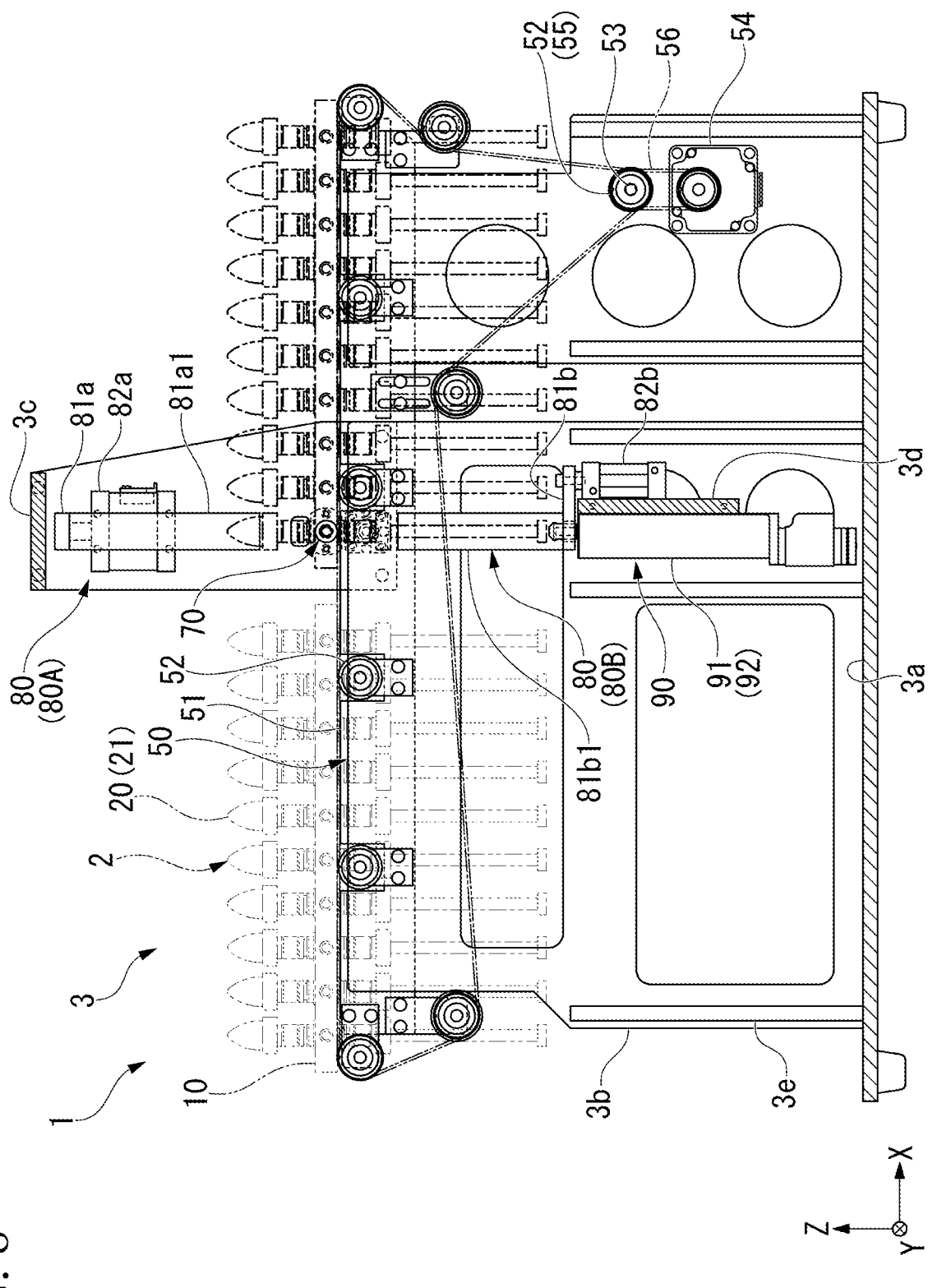
FIG. 8 is a view along line B-B shown in FIG. 7.
Figure 9:
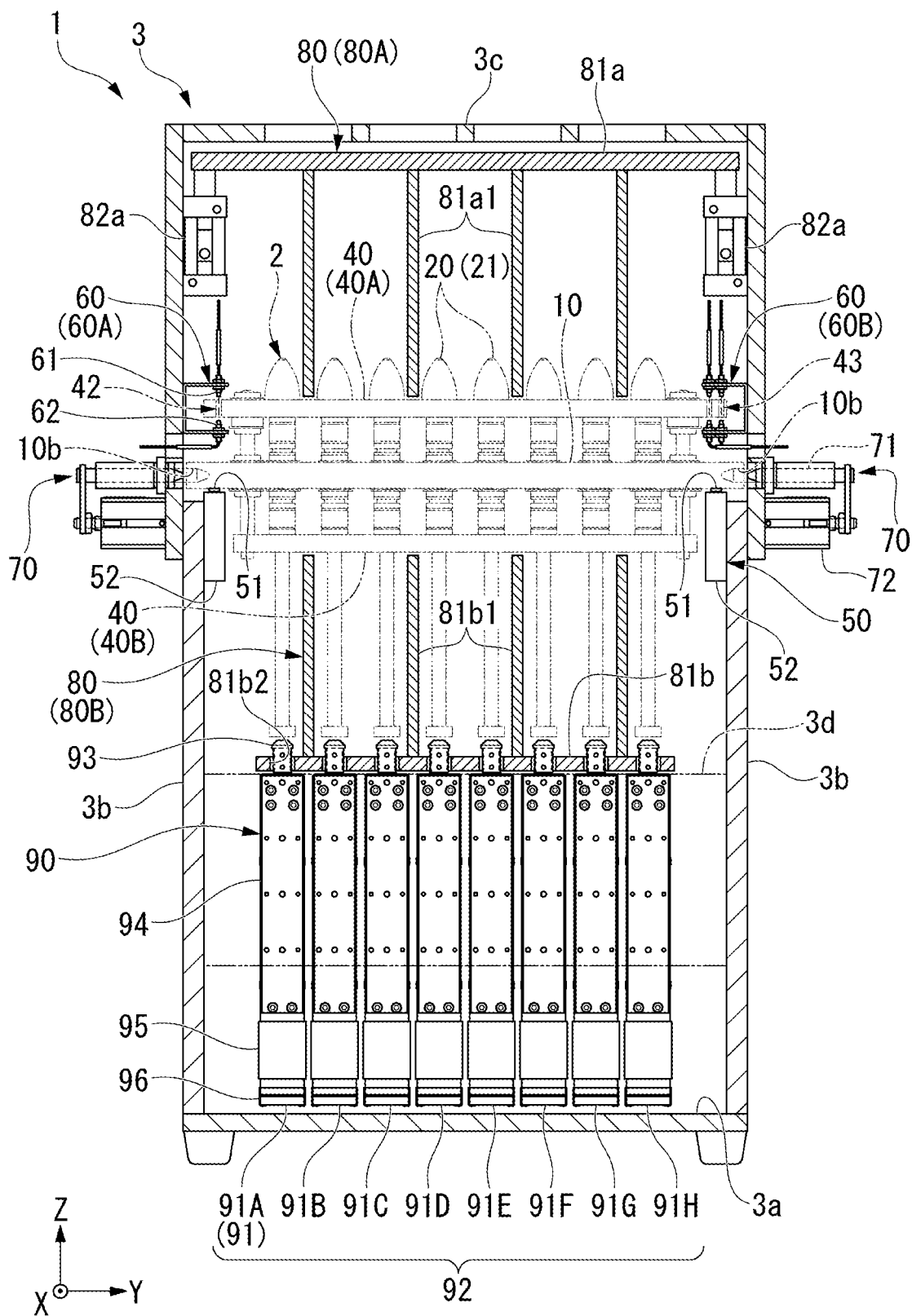
FIG. 9 is a view along line C-C shown in FIG. 7.

FIG. 7 is a plan view of the device main body 3 in the first embodiment of the present invention. FIG. 8 is a view along line B-B shown in FIG. 7. FIG. 9 is a view along line C-C shown in FIG. 7.

The device main body 3 includes a bottom plate 3a having a rectangular shape in a plan view as shown in FIG. 7, a pair of side plates 3b erected from both sides in the width direction of the bottom plate 3a, and a top plate 3c that connects upper ends of the pair of side plates 3b to each other as shown in FIG. 9. A support plate 3d (a beam member) that supports the actuator row 92, which will be described later, is installed between the pair of side plates 3b. Further, the pair of side plates 3b are connected to the bottom plate 3a by a plurality of connecting plates 3e (reinforcing members) shown in FIG. 7.

An XYZ Cartesian coordinate system is also set in the description of the device main body 3, and a positional relationship of members may be described with reference to the XYZ Cartesian coordinate system. The X-axis direction is a longitudinal direction of the device main body 3 (the bottom plate 3a having a rectangular shape in a plan view), that is also referred to as a transport direction of the multi-product pallet 2. Also, the Y-axis direction is a width direction of the device main body 3 (a direction in which the pair of side plates 3b face each other), and the Z-axis direction is a height direction of the device main body 3.

The device main body 3 includes a pallet transport unit 50 that transports the multi-product pallet 2, as shown in FIGS. 7 and 8, a pallet position-detecting unit 60 that detects a position of the multi-product pallet 2 conveyed by the pallet transport unit 50, a pallet position-fixing unit 70 that fixes the position of the multi-product pallet 2 based on the result received from the pallet position-detecting unit 60, a pallet displacement restriction-releasing unit 80 that releases the displacement restriction performed by the above-described displacement-restricting mechanism 30 of the multi-product pallet 2 of which the position is fixed by the pallet position-fixing unit 70, and a pallet shape-restoring unit 90 that displaces the workpiece contact part 20 of the multi-product pallet 2 for which the displacement restriction is released by the pallet displacement restriction-releasing unit 80, as shown in FIG. 9.

As shown in FIG. 7, the pallet transport unit 50 includes a pair of transport belts 51 that support the lower surface of the pallet main body 10 of the multi-product pallet 2. The pair of transport belts 51 are installed to be capable of endlessly circulating in the X-axis direction with a plurality of pulleys 52 attached to the pair of side plates 3b. One of the plurality of pulleys 52 is connected to the pulley 52 facing the one pulley 52 in the Y-axis direction through a drive shaft 53. The drive shaft 53 is rotated forward and in reverse by a stepping motor 54 around an axis extending in the Y-axis direction. The stepping motor 54 rotates the drive shaft 53 through a drive pulley 55 fixed to the drive shaft 53 and a drive belt 56 wound around the drive pulley 55.

As shown in FIG. 9, the pallet position-detecting unit 60 is provided on each of the pair of side plates 3b. The pallet position-detecting unit 60A provided on the side plate 3b on one side (a −Y side) includes an optical sensor (photointerrupter or the like) including a light emitting part 61 and a light receiving part 62. The pallet position-detecting unit 60A includes two sets of the optical sensors separated from each other in the transport direction (the X-axis direction) of the multi-product pallet 2 and detects the above-described position detection pattern 42 formed in the connecting mechanism 40A shown in FIG. 3. Further, the pallet position-detecting unit 60B provided on the side plate 3b on the other side (a +Y side) has four sets of the above-described optical sensors, and detects the above-described row detection pattern 43 with four bits formed in the connecting mechanism 40A shown in FIG. 3.

The pallet position-fixing unit 70 is located below the pallet position-detecting unit 60 and is provided on each of the pair of side plates 3b. The pallet position-fixing unit 70 includes a positioning pin 71 having a tapered tip end and an actuator 72 that moves the positioning pin 71 in the Y-axis direction. The actuator 72 includes, for example, an air cylinder and a solenoid valve that supplies air to the air cylinder and, by turning the solenoid valve ON/OFF, inserts and removes the positioning pin 71 with respect to the above-described positioning hole 10b formed in the pallet main body 10.

The pallet displacement restriction-releasing unit 80 is disposed on an upper side and a lower side of a transport path through which the multi-product pallet 2 is transported by the pallet transport unit 50. The pallet displacement restriction-releasing unit 80A disposed on the upper side (+Z side) of the transport path includes a pressing member 81a capable of pressing the above-described connecting mechanism 40A, and a pair of actuators 82a that move the pressing member 81a in the Z-axis direction. The pressing member 81a includes comb-shaped pressing parts 81a1 capable of pressing the connecting mechanism 40A while avoiding the workpiece contact part 20. The number of the pressing parts 81a1 of the present embodiment is half of that of the workpiece contact parts 20 included in the workpiece contact row 21 and the pressing parts 81a1 are disposed at equal intervals in the Y-axis direction.

The pair of actuators 82a are located above the pallet position-detecting unit 60, are provided on the pair of side plates 3b, and are connected to both ends of the pressing member 81a in the Y-axis direction. The pair of actuators 82a include, for example, an air cylinder and a solenoid valve that supplies air to the air cylinder, and, by turning the solenoid valve ON/OFF, move the pressing member 81a up and down.

On the other hand, the pallet displacement restriction-releasing unit 80B disposed on the lower side (−Z side) of the transport path includes a pressing member 81b capable of pressing the above-described connecting mechanism 40B, and a pair of actuators 82b (see FIG. 7) that move the pressing member 81a in the Z-axis direction. The pair of actuators 82b are air cylinders driven by a solenoid valve like the pair of actuators 82a described above, but are attached to a surface of the support plate 3d facing a +X side (a downstream side in the transport direction of the multi-product pallet 2). Further, the pressing member 81b includes comb-shaped pressing parts 81b1 like the above-described pressing member 81a, but extends from directly above the pair of actuators 82a to directly above actuators 91A to 91H which will be described later. As shown in FIG. 9, the pressing member 81a includes through holes 81b2 for avoiding interference with shafts 93 of the actuators 91A to 91H.

The pallet shape-restoring unit 90 is disposed below the transport path of the multi-product pallet 2. The pallet shape-restoring unit 90 includes one actuator row 92 in which actuators 91A to 91H form a row, a number of the actuators 91A to 91H being same as that of the workpiece contact parts 20 included in one row of the workpiece contact rows 21. The actuator row 92 displaces the workpiece contact parts 20 in each workpiece contact row 21. That is, one actuator row 92 displaces a plurality of workpiece contact parts 20 included in each row of the plurality of workpiece contact rows 21. Hereinafter, a position where the actuator row 92 is disposed in the transport direction (the X-axis direction) of the multi-product pallet 2 may be referred to as a shape-restoring position. That is, the position where the actuator row 92 is disposed and a position facing the position where the actuator row 92 is disposed in the Z-axis direction may be referred to as a shape-restoring position.

The actuators 91 are disposed at an equal pitch in the Y-axis direction in which the actuators 91A to 91H form a row. The pitch of the actuators 91 in the Y-axis direction and the pitch of the above-described workpiece contact parts 20 in the Y-axis direction are equal to each other. Each actuator 91 includes a shaft 93, a linear motion guide mechanism 94 that guides the shaft 93 in the Z-axis direction, a drive unit 95 that moves the shaft 93 in the Z-axis direction through the linear motion guide mechanism 94, and a driver 96 that drives the drive unit 95.

A truncated conical cap that can be inserted into the above-described counterbore 24a shown in FIG. 6 is attached to an upper end of the shaft 93.

The linear motion guide mechanism 94 is, for example, a ball screw mechanism and moves the shaft 93 (a screw shaft) in the Z-axis direction by rotating a nut (not shown).

The drive unit 95 includes, for example, a motor that rotates the nut of the linear motion guide mechanism 94 and a rotary encoder that detects a rotation speed of the motor. The actuator 91 may be provided with a displacement sensor (a linear encoder or the like) as long as it can detect a displacement amount of the shaft 93.

Next, a configuration of the driver 96 and a configuration of a control system 100 including the driver 96 will be described in detail.

Figure 10:
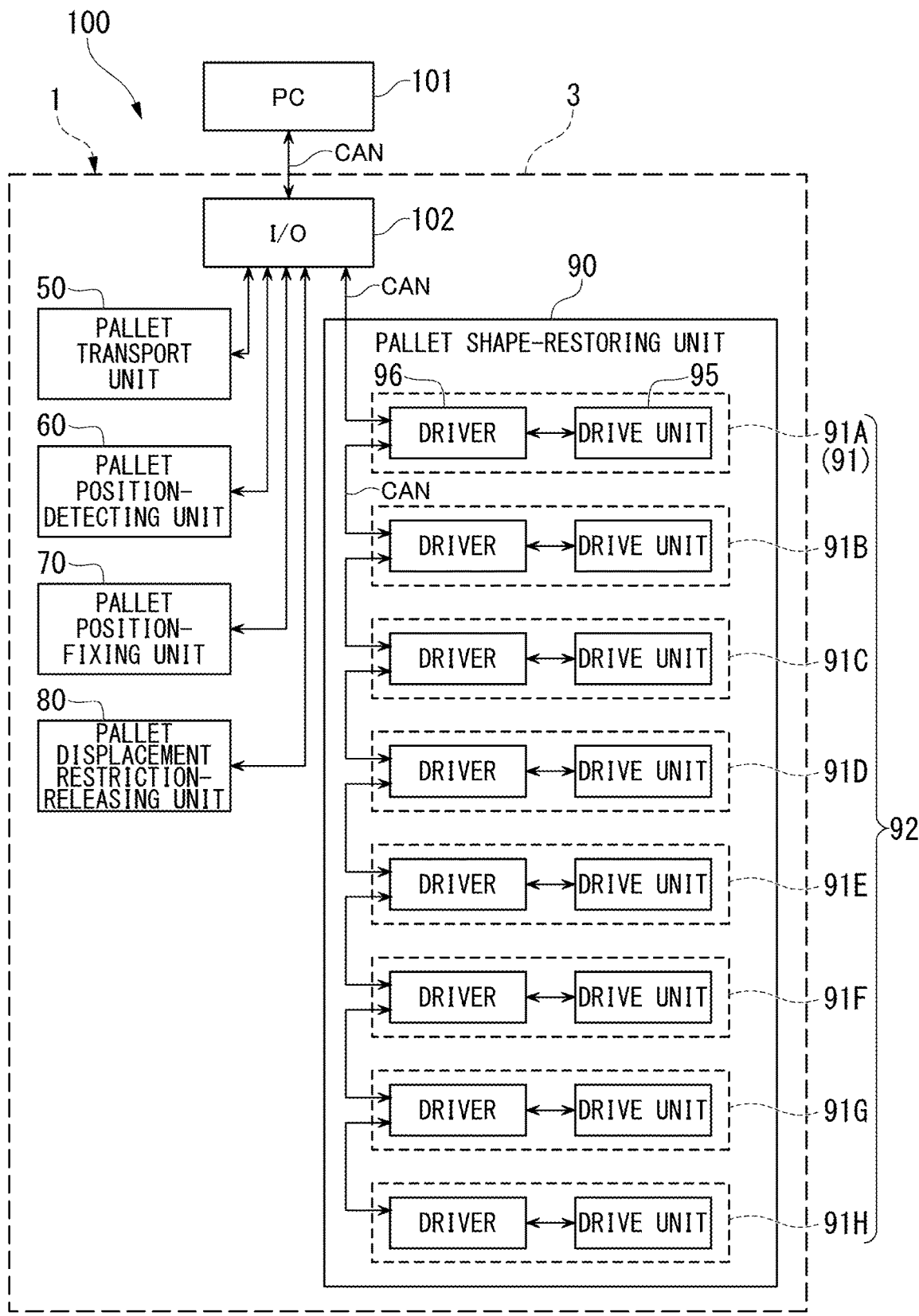
FIG. 10 is a configuration diagram showing a schematic configuration of a control system for a multi-product pallet device in the first embodiment of the present invention.
Figure 11:
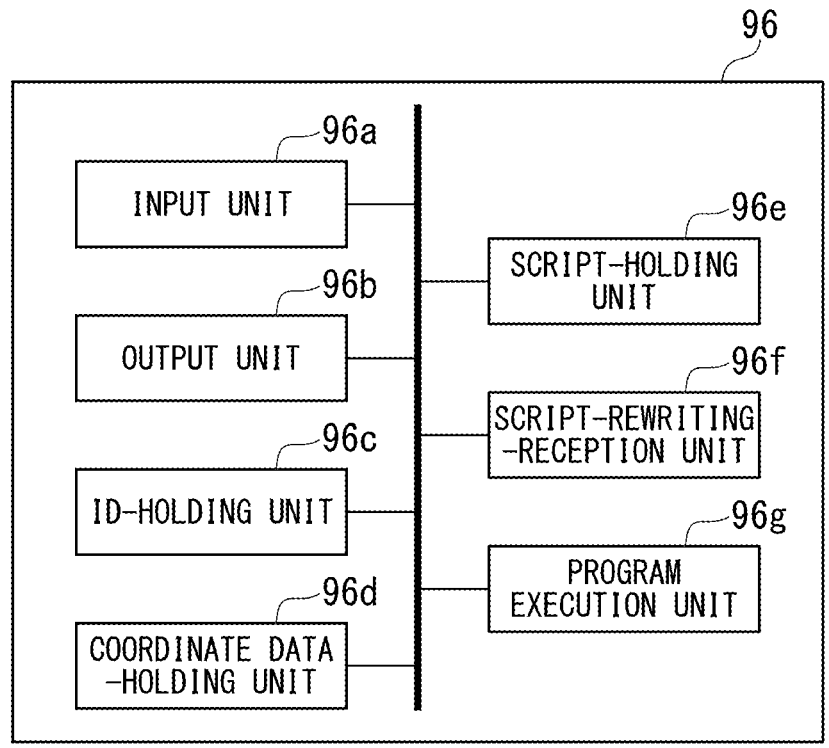
FIG. 11 is a functional block diagram of a driver included in the control system shown in FIG. 10.
Figure 12:
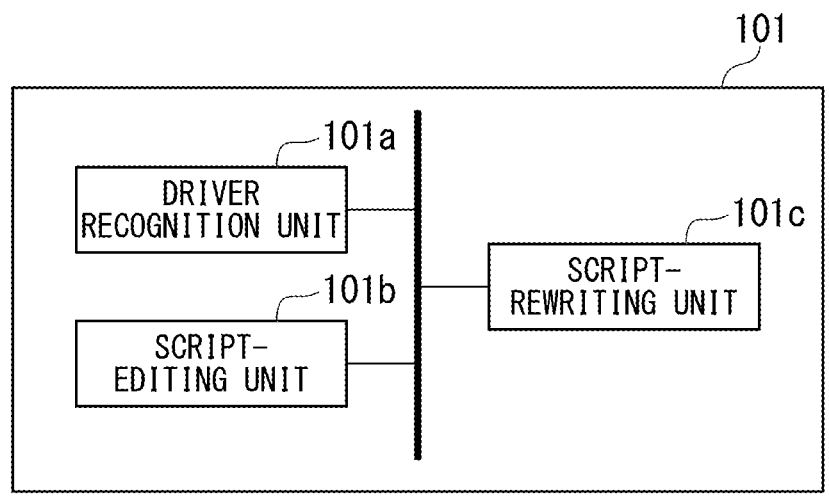
FIG. 12 is a functional block diagram of a shape restoration data-generating device included in the control system shown in FIG. 10.

FIG. 10 is a configuration diagram showing a schematic configuration of the control system 100 for the multi-product pallet device 1 in the first embodiment of the present invention. FIG. 11 is a functional block diagram of the driver 96 included in the control system 100 shown in FIG. 10. FIG. 12 is a functional block diagram of a shape restoration data-generating device 101 included in the control system 100 shown in FIG. 10.

As shown in FIG. 10, the multi-product pallet device 1 (the device main body 3) can be electrically connected to the external shape restoration data-generating device 101 through an I/O unit 102.

The I/O unit 102 is configured to include an I/O node, a line concentrator, and the like and is connected to the shape restoration data-generating device 101 which will be described later and various devices (the pallet transport unit 50, the pallet position-detecting unit 60, the pallet position-fixing unit 70, the pallet displacement restriction-releasing unit 80, and the pallet shape-restoring unit 90 (that is, the actuators 91A to 91H)) provided in the above-described device main body 3 to communicate therewith. Further, the I/O unit 102 includes a control unit for performing monitoring/issuing commands to the various connected devices. The control unit monitors a dedicated processor and the various devices connected to the control unit by a program executed by a processor, and the like and adjusts a timing of an operation. An ID for identifying the I/O unit 102 is stored in this control unit.

The driver 96 of each actuator 91 of the pallet shape-restoring unit 90 is integrally provided with a control unit for controlling the drive unit 95 of each actuator 91. The control unit is formed of a dedicated processor, a program which is executed by a processor, and the like. In the control system 100, as shown in FIG. 10, the control units installed on the drivers 96 of the actuators 91 are connected in series in a daisy-chain, and controller area network (CAN) communication is possible between the control units. An ID for identifying each of the drivers is set in each of the drivers 96 of the actuators 91, and the ID is stored in the control unit of the driver. The control units of the I/O unit 102 and the driver 96 may include a central processing unit (CPU) and a memory such as a random access memory (RAM) or a read only memory (ROM). Further, the control unit may further include a storage device such as a hard disk drive (HDD) or a solid state drive (SSD).

The shape restoration data-generating device 101 can be connected to the I/O unit 102 from outside. The shape restoration data-generating device 101 is connected to a CAN communication line in the above-described daisy-chain connection and, with this connection, can rewrite an actuator-driving control script (program) of the driver 96 of each of the plurality of actuators 91 connected in the daisy-chain. Therefore, when it is not necessary to rewrite the script, it is not necessary to establish the connection between the shape restoration data-generating device 101 and the I/O unit 102. The shape restoration data-generating device 101 is formed as a personal computer or a microcomputer in which a program for rewriting the script is executed. The shape restoration data-generating device 101 may include a CPU and a memory such as a RAM or a ROM.

Here, FIG. 11 shows a functional block diagram that represents functions exhibited in the control unit of the driver 96 of the actuator 91 to be imaged. The functions represented by the functional block are realized by a program executed by the control unit using hardware such as a processor, an input/output port, and a memory provided on the driver 96. Further, FIG. 12 represents the control executed by the shape restoration data-generating device 101 as a functional block to be imaged. The control content performed by this functional block is also realized by various methods such as a processor of the shape restoration data-generating device 101 and a program executed therein.

The control unit of the driver 96 includes an input unit 96a, an output unit 96b, an ID-holding unit 96c, a coordinate data-holding unit 96d, a script-holding unit 96e, a script-rewriting-reception unit 96f, and a program execution unit 96g. The input unit 96a is a functional unit into which data necessary for drive control of the drive unit 95 to which the driver 96 directly corresponds is input through an input port of the driver 96. Further, the input unit 96a is also a functional unit into which a command signal for the drive unit 95 is input from the drivers 96 of other actuators 91.

The output unit 96b, contrary to the input unit 96a, is a functional unit that outputs the command signal through an output port of the driver 96 to the control units of other drivers 96, the command signal being for driving drive units 95 directly associated with the drivers 96 of other actuators 91. Therefore, the command signal output from the output unit 96b of the control unit of the driver 96 is input to the input unit 96a of the control unit of another driver 96 which is an output destination.

The ID holding unit 96c is a functional unit that holds an identification ID set for each driver 96 as described above. Specifically, the identification ID is held in the memory on the driver 96. The coordinate data-holding unit 96d is a functional unit that stores coordinate data belonging to a movable range that the actuator 91 can take with respect to driving of the drive unit 95 (coordinate data of the actuator 91 in a movable range of the actuator 91). In the program in the script-holding unit 96e, a command for directly specifying the coordinates of a movement destination of the drive unit 95 (the upper end of the shaft 93) is prepared and the coordinate data held in the coordinate data-holding unit 96d is used as an argument of the command.

The script-holding unit 96e is a functional unit that holds a script in the memory in the driver 96, the script including a program related to the drive control of the drive unit 95 directly associated with the driver 96. The script-rewriting-reception unit 96f is a functional unit that receives a rewriting instruction when the script is to be rewritten by the external shape restoration data-generating device 101. Therefore, when the script edited by the shape restoration data-generating device 101 is received by the script-rewriting-reception unit 96f together with the rewriting command, the drive control program (script) held by the script-holding unit 96e is rewritten.

The program execution unit 96g executes the drive control program (script) held by the script-holding unit 96e and actually performs drive control of the actuator 91. The program is configured such that the actuator 91 to be driven can be specified with the identification ID of the driver 96 thereof. The program execution unit 96g can be referred to as a motor control unit that controls the drive unit 95 (the motor).

In this way, the drivers 96 are electrically connected to each other such that the driver 96 of one actuator 91 forms an intercommunication state with the driver 96 of the other actuator 91, the number of wires connecting the drivers 96 to each other is small, and the control system 100 can be easily established. The similar drivers 96 may be connected to the actuators of various devices provided in the device main body 3 other than the pallet shape-restoring unit 90, and the drivers and the actuators may be electrically connected to each other such that an intercommunication state is formed. The control unit of the I/O unit 102 described above serves as a master (a head) of the control units of the various connected devices. The control unit of the I/O unit 102 also holds a script having a configuration substantially similar to that of the above-described driver 96 shown in FIG. 11 and communicates with the various connected devices using the script to perform monitoring and issuing commands. It can be said that the control unit of the I/O unit 102 correspond to the configuration of the driver 96 shown in FIG. 11 to which a functional block called an I/O input and output unit is added.

As shown in FIG. 12, the shape restoration data-generating device 101 includes a driver recognition unit 101a, a script-editing unit 101b, and a script-rewriting unit 101c. The driver recognition unit 101a is a functional unit that recognizes a driver included in the control system 100 in a state in which the shape restoration data-generating device 101 is connected to the control system 100 through the CAN communication connection. The driver 96 recognized by the driver recognition unit 101a is a target of editing or rewriting the script by the shape restoration data-generating device 101.

The script-editing unit 101b is a functional unit that performs editing processing such as addition, change and deletion to the script held by the control unit of the driver 96 included in the control system 100. The script-rewriting unit 101c is a functional unit that rewrites the script held in the script-holding unit 96e of the driver 96 by reflecting the script editing performed by the script-editing unit 101b. The rewriting of the script is performed through the CAN communication connection between the shape restoration data-generating device 101 and the control system 100 and the daisy-chain connection between the input and output port of each driver 96 and the driver 96.

Subsequently, the drive control of the actuator 91 will be described in detail. The driver 96 of each actuator 91 drives the drive unit 95 of each actuator 91 based on the shape restoration data as shown in FIGS. 13 and 14 below.

Figures 13, 14:
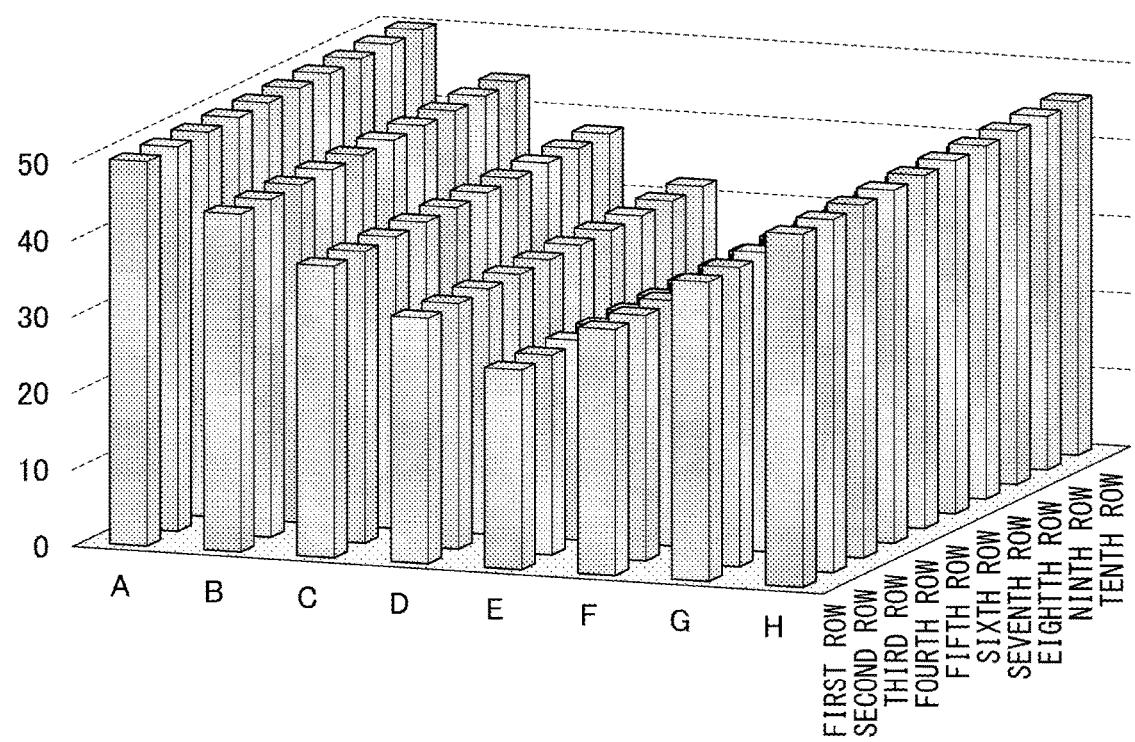
FIG. 13 is a diagram showing an example of shape restoration data stored in a driver of each actuator in the first embodiment of the present invention.
FIG. 14 is a graphic diagram in which the shape restoration data shown in FIG. 13 is represented as a bar graph.

FIG. 13 is a diagram showing an example of the shape restoration data stored in the driver 96 of each actuator 91 in the first embodiment of the present invention. FIG. 14 is a graphic diagram in which the shape restoration data shown in FIG. 13 is represented as a bar graph.

The shape restoration data shown in FIG. 13 is table data that holds coordinate data that specifies how much the drivers 96 of the actuators 91A to 91H drive the drive units 95 in which row of the workpiece contact rows 21. Although the table data shown in FIG. 13 is 8×10, it can be appropriately expanded according to the number of the actuators 91 and the number of the workpiece contact rows 21.

The drivers 96 of the actuators 91A to 91H store a sequence corresponding to A to H (first to tenth rows). That is, the driver 96 of the actuator 91A stores the coordinate data corresponding to first to tenth rows of A, the driver 96 of the actuator 91B stores the coordinate data corresponding to first to tenth rows of B, and similarly, the drivers 96 of the actuators 91C to 91H also store the coordinate data corresponding to first to tenth rows of C to H respectively.

The shape restoration data-generating device 101 shown in FIG. 10 generates the above-described shape restoration data and stores the generated shape restoration data in the driver 96 of each actuator 91 of the device main body 3. The shape restoration data-generating device 101 can generate the shape restoration data based on three-dimensional data of a workpiece W as shown in FIG. 15, for example.

Figure 15:
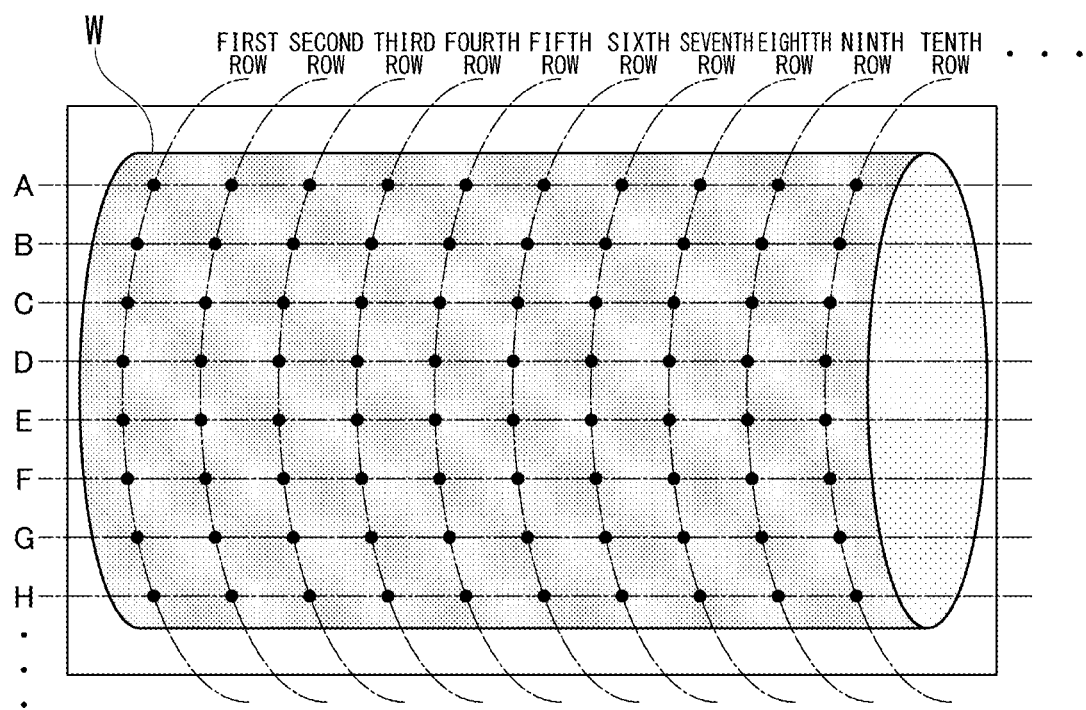
FIG. 15 is an explanatory diagram illustrating a method of generating the shape restoration data in the first embodiment of the present invention.

Specifically, the shape restoration data-generating device 101 determines a lower surface (a support surface) of the three-dimensional data of the workpiece W and cuts the lower surface into round slices according to the number of the workpiece contact rows 21 (in a longitudinal direction in the example shown in FIG. 15, that is, the width direction orthogonal to the transport direction of the multi-product pallet 2). Next, when the lower surface is cut in the lateral direction (that is, the transport direction of the multi-product pallet 2) at A to H in accordance with the number of the actuators 91 (the workpiece contact parts 20), points where the longitudinal and lateral cut lines intersect with each other are extracted, and at each point, a distance from a reference surface (a surface of an initial position (zero displacement) of the workpiece contact part 20) is obtained as coordinate data.

Next, the shape restoration data-generating device 101 generates the above-described table data as shown in FIG. 13 from the obtained coordinate data. Then, the sequence corresponding to A to H of the table data is stored in the drivers 96 of the actuators 91A to 91H corresponding to A to H. As a result, the drivers 96 of the actuators 91A to 91H can read the stored coordinate data and drive the drive units 95 based on the coordinate data. For example, if the coordinate data as shown in FIG. 13 is specified, it is possible to drive the actuators 91 according to the coordinate data and to displace the workpiece contact parts 20 of the multi-product pallet 2 to be the same as the geometricized shape restoration data as shown in FIG. 14 (see FIGS. 16A and 16B).

Figure 16A:
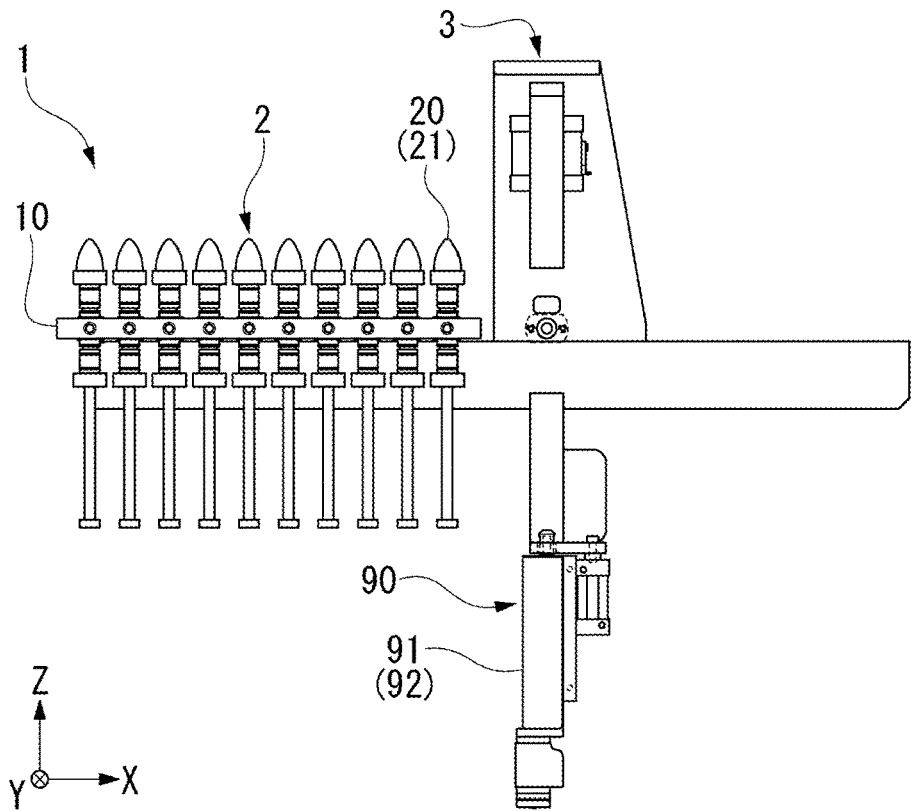
FIG. 16A is an explanatory diagram illustrating an operation of the multi-product pallet device according to the first embodiment of the present invention.

To explain a specific operation, first, the multi-product pallet 2 is set in the device main body 3 as shown in FIG. 16A. Next, when a start switch (not shown) connected to the I/O unit 102 (see FIG. 10) of the device main body 3 is pressed, the pallet transport unit 50 transports the multi-product pallet 2. The pallet transport unit 50 transports the workpiece contact rows 21 of the multi-product pallets 2 one by one to the shape-restoring position (directly above the actuator row 92 shown in FIG. 8) where the actuator row 92 is disposed.

When the pallet position-detecting unit 60A shown in FIG. 9 detects the position detection pattern 42 formed on the connecting mechanism 40A at the shape-restoring position, the pallet transport unit 50 stops the transport of the multi-product pallet 2. Next, the pallet position-fixing unit 70 is driven, the positioning pin 71 is inserted into the positioning hole 10b, and the position of the multi-product pallet 2 is fixed. Next, the pallet displacement restriction-releasing units 80A and 80B are driven to press the connecting mechanisms 40A and 40B and to release the displacement restriction of the workpiece contact part 20 included in the workpiece contact row 21 located at the shape-restoring position.

Next, the pallet shape-restoring unit 90 is driven, and the workpiece contact parts 20A to 20H from which the displacement restriction is released are lifted by the actuators 91A to 91H provided in the same number as the workpiece contact parts 20A to 20H. At the shape-restoring position, the pallet position-detecting unit 60B shown in FIG. 9 detects the row detection pattern 43 formed in the connecting mechanism 40A, and the actuators 91A to 91H read out the coordinate data of the shape restoration data stored in the drivers 96 from the detection result of the pallet position-detecting unit 60B and drive the drive units 95 based on the coordinate data.

When the driver 96 confirms that the drive units 95 (the upper end of the shaft 93) has moved to the specified coordinates by a rotary encoder or the like, the driver 96 stops the drive unit 95. Next, the pallet displacement restriction-releasing units 80A and 80B are driven to release the pressing of the connecting mechanisms 40A and 40B. As a result, as shown in FIG. 6, the workpiece contact part 20 cannot be displaced in the Z-axis direction, and the state after the displacement can be maintained. Then, the actuators 91A to 91H return the shaft 93 to the initial position, and the pallet transport unit 50 transports the next workpiece contact row 21 to the shape-restoring position.

Figure 16B:
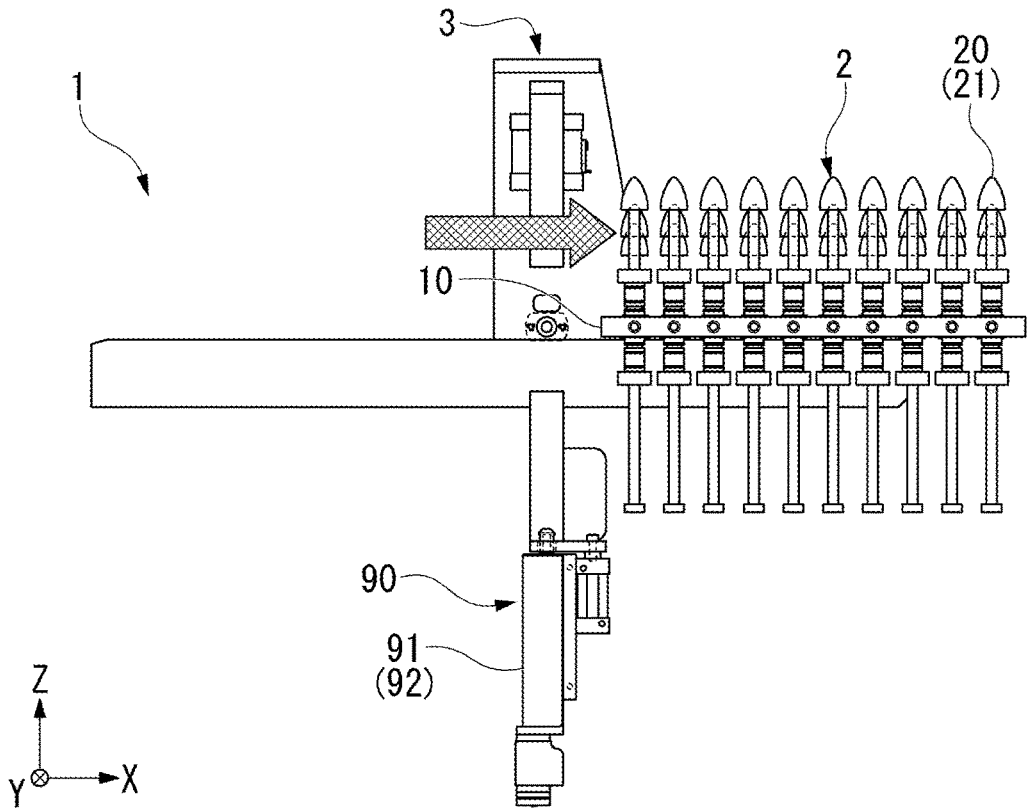
FIG. 16B is an explanatory diagram illustrating the operation of the multi-product pallet device according to the first embodiment of the present invention.

By repeating the above operation with respect to the workpiece contact rows 21-1 to 21-10, it is possible to restore the shape of the multi-product pallet 2 based on the shape restoration data as shown in FIG. 16B.

After the shape of the multi-product pallet 2 is restored in this way, the multi-product pallet 2 can be detached from the device main body 3, be placed on an auxiliary table 4 or the like as shown in FIG. 2 and be transported together with the workpiece.

As described above, according to the multi-product pallet device 1 of the present embodiment, a configuration which includes the multi-product pallet 2 deforming a shape thereof in conformity with a shape of the workpiece, and the device main body 3 which stores the shape restoration data for deforming the multi-product pallet 2 and restores the shape of the multi-product pallet 2 based on the shape restoration data, and in which the multi-product pallet 2 is detachable from the device main body 3 is employed. Thus, it is possible to cause the workpiece to flow on a manufacturing line together with the multi-product pallet 2, and the usability is improved. Further, since the device main body 3 stores the shape restoration data for deforming the multi-product pallet 2, the shape of a large number of multi-product pallets 2 can be restored if there is only one device main body 3. That is, it is possible to mass-produce the multi-product pallet 2 having a shape corresponding to a workpiece. Further, when restoring the shape of the multi-product pallet 2, it is not necessary to press the multi-product pallet 2 against the workpiece and deform in conformity with the shape of the workpiece as in the related art. Therefore, the multi-product pallet device 1 of the present embodiment can be applied to a soft workpiece or a fragile workpiece, for example.

Further, in the present embodiment, the multi-product pallet 2 includes the plurality of workpiece contact rows 21 in each of which the workpiece contact parts 20 displaceable with respect to the pallet main body 10 form a row, the device main body 3 includes one actuator row 92 in which the actuators 91 form a row, the number of the actuators 92 being the same as that of the workpiece contact parts 20 included in one row of the workpiece contact rows 21, and the actuator row 92 displaces the workpiece contact parts 20 in each workpiece contact row 21. According to this configuration, the time for restoring the shape of the multi-product pallet 2 can be significantly shortened as compared with the configuration in which the workpiece contact parts 20 are displaced one by one as in the related art.

Further, in the present embodiment, each actuator 91 included in the actuator row 92 includes the drive unit 95 and the driver 96 which drives the drive unit 95, and the drivers 96 are electrically connected to each other such that the driver 96 of one actuator 91 forms an intercommunication state with the driver 96 of another actuator 91. According to this configuration, the number of wires connecting the actuators 91A to 91H to each other is small, and the control system 100 can be easily established. That is, the control system 100 having excellent expandability can be established.

Further, in the present embodiment, the multi-product pallet 2 includes the displacement-restricting mechanism 30 which is provided in each workpiece contact part 20 and restricts displacement of the workpiece contact part 20 in at least any one of displacement directions of the workpiece contact part 20, and the connecting mechanism 40 which connects the displacement-restricting mechanisms 30 to each other such that displacement restriction of the workpiece contact parts 20 can be released for each workpiece contact row 21. According to this configuration, it is possible to maintain the state after the displacement of the workpiece contact part 20 by the displacement-restricting mechanism 30, and, since the displacement-restricting mechanisms 30 are connected to each other by the connecting mechanism 40, even in a case in which a load is locally applied to some of the displacement-restricting mechanisms 30, it is possible to eliminate the concern that only the displacement restriction of some of the workpiece contact parts 20 of the displacement-restricting mechanisms 30 is unexpectedly released.

Further, in the present embodiment, the device main body 3 includes the pallet transport unit 50 which transports the workpiece contact rows 21 of the multi-product pallet 2 one by one to a shape-restoring position where the actuator row 92 is disposed, and the pallet displacement restriction-releasing unit 80 which, at the shape-restoring position, presses the connecting mechanism 40 to release the displacement restriction of the workpiece contact parts 20 for each workpiece contact row 21 and, after the workpiece contact parts 20 included in the workpiece contact row 21 are displaced by the actuator row 92, releases pressing on the connecting mechanism 40. According to this configuration, it is possible to release the displacement restriction for each workpiece contact row 21 and to perform the displacement restriction of the workpiece contact parts 20 after the displacement, and thus the time for restoring the shape of the multi-product pallet 2 can be significantly shortened.

Further, the control system 100 for the multi-product pallet device 1 of the present embodiment includes the multi-product pallet device 1 and the shape restoration data-generating device 101 that generates the shape restoration data, and the shape restoration data-generating device 101 generates the shape restoration data based on the three-dimensional data on the workpiece and stores the generated shape restoration data in the device main body 3. Therefore, even if the workpiece is soft or fragile, it is possible to generate the shape restoration data of the multi-product pallet 2.

Figure 17A:
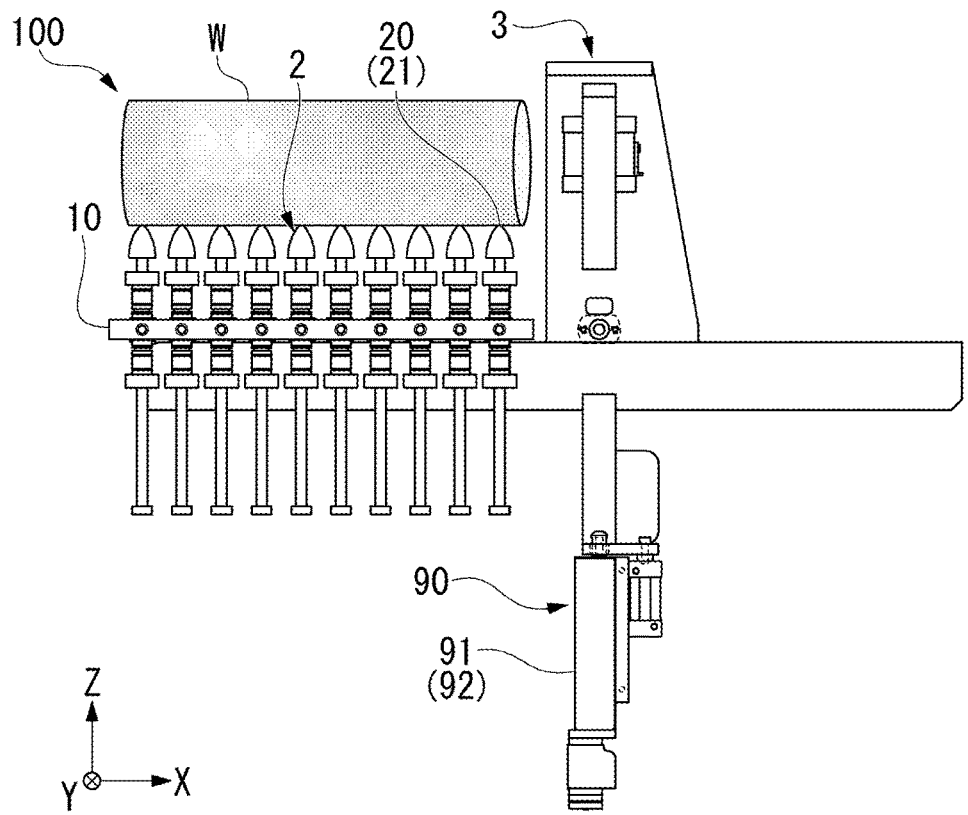
FIG. 17A is an explanatory diagram illustrating a modification example of the method of generating the shape restoration data in the first embodiment of the present invention.
Figure 17B:
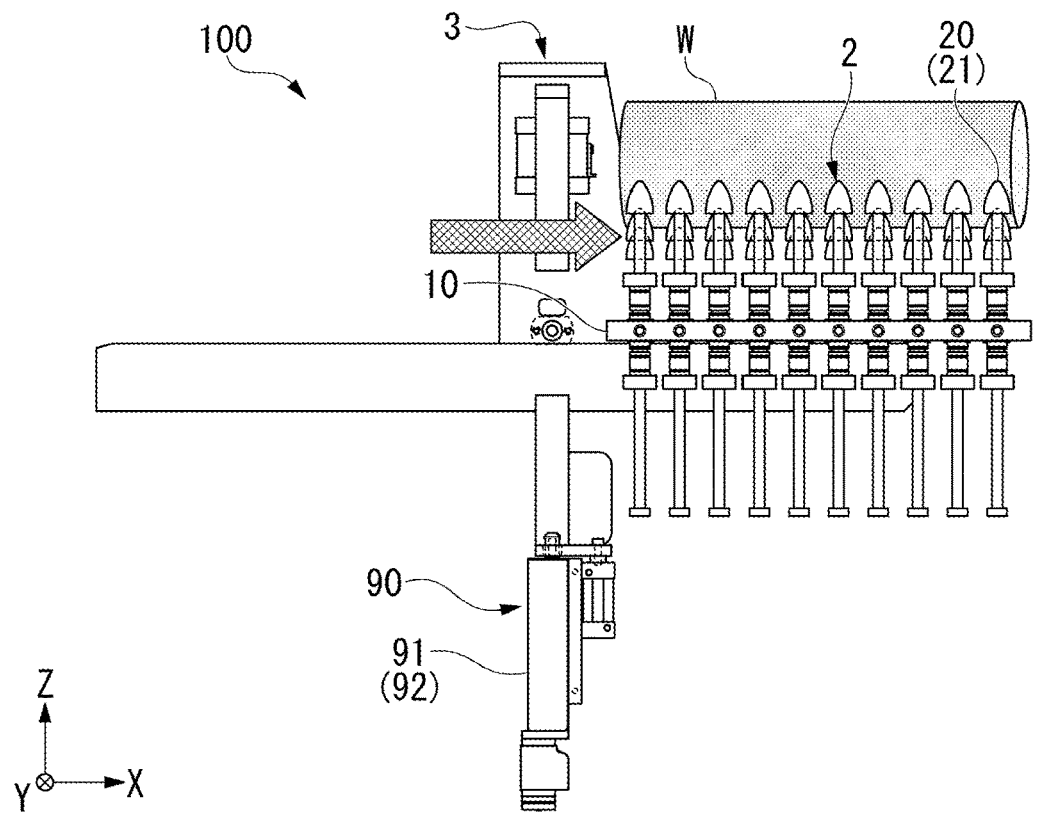
FIG. 17B is an explanatory diagram illustrating the modification example of the method of generating the shape restoration data in the first embodiment of the present invention.

In a case in which the workpiece W is hard to some extent, as shown in FIGS. 17A and 17B, the shape restoration data-generating device 101 may generate the shape restoration data based on actual data obtained when the multi-product pallet device 1 actually deforms the multi-product pallet 2 in conformity with the shape of the workpiece W.

Specifically, as shown in FIG. 17A, the workpiece W is placed on the multi-product pallet 2, and the multi-product pallet 2 is transported in the same manner as in FIGS. 16A and 16B described above. The workpiece W may be fixed on the multi-product pallet 2 using a fixture (a rope, a vise, and the like) which is not shown. Further, the top plate 3c and the pressing member 81a shown in FIG. 9 may be detached or changed in shape according to the shape of the workpiece W. Further, as shown in FIG. 17A, in a case in which all the workpiece contact parts 20 are lowered to the initial positions, it is not necessary to release the downward displacement restriction of the workpiece contact part 20 in the displacement restriction release which will be described later, and thus, it is not necessary to release the displacement restriction by the pallet displacement restriction-releasing unit 80A described above. That is, only the pressing member 81b is preferably included, and the pressing member 81a may be detached.

At the shape-restoring position directly above the actuator row 92, the workpiece contact rows 21 are transported one by one, and the above-described position detection, position fixing, and displacement restriction releasing are performed. After the displacement restriction is released, the driver 96 of each of the actuators 91A to 91H drives the drive unit 95 until the upper end of the shaft 93 comes into contact with the workpiece W. The timing at which the driver 96 stops the drive unit 95 is when the upper end of the shaft 93 comes into contact with the workpiece W and a value of a rotary encoder does not advance, or when a current value of the drive unit 95 exceeds a predetermined threshold value due to the contact with workpiece W. The driver 96 also stops the drive unit 95 in a case in which the upper end of the shaft 93 does not come into contact with the workpiece W for a certain period of time (for example, in a case in which the workpiece W includes a hole).

When the drive units 95 of the actuators 91A to 91H are stopped, the pallet displacement restriction-releasing unit 80 is driven to restrict the displacement of the workpiece contact parts 20A to 20H. Then, the shape restoration data-generating device 101 obtains displacement data (actual data) of the drive unit 95 of each of the actuators 91A to 91H from a displacement sensor (a rotary encoder or the like) and generates the coordinate data of the workpiece contact row 21. The coordinate data may be zero at a place where the upper end of the shaft 93 does not come into contact with the workpiece W. By repeating the above operation with respect to all the workpiece contact rows 21 (21-1 to 21-10) as shown in FIG. 17B, it is possible to generate the shape restoration data as shown in FIGS. 13 and 14. According to this configuration, the shape restoration data of the multi-product pallet 2 can be generated from the workpiece W (an actual object) even if there is no three-dimensional data of the workpiece W.

Second Embodiment

Next, a second embodiment of the present invention will be described. In the following description, the same or equivalent configurations as those in the above-described embodiment are specified by the same reference signs, and the description thereof will be simplified or omitted.

Figure 18:
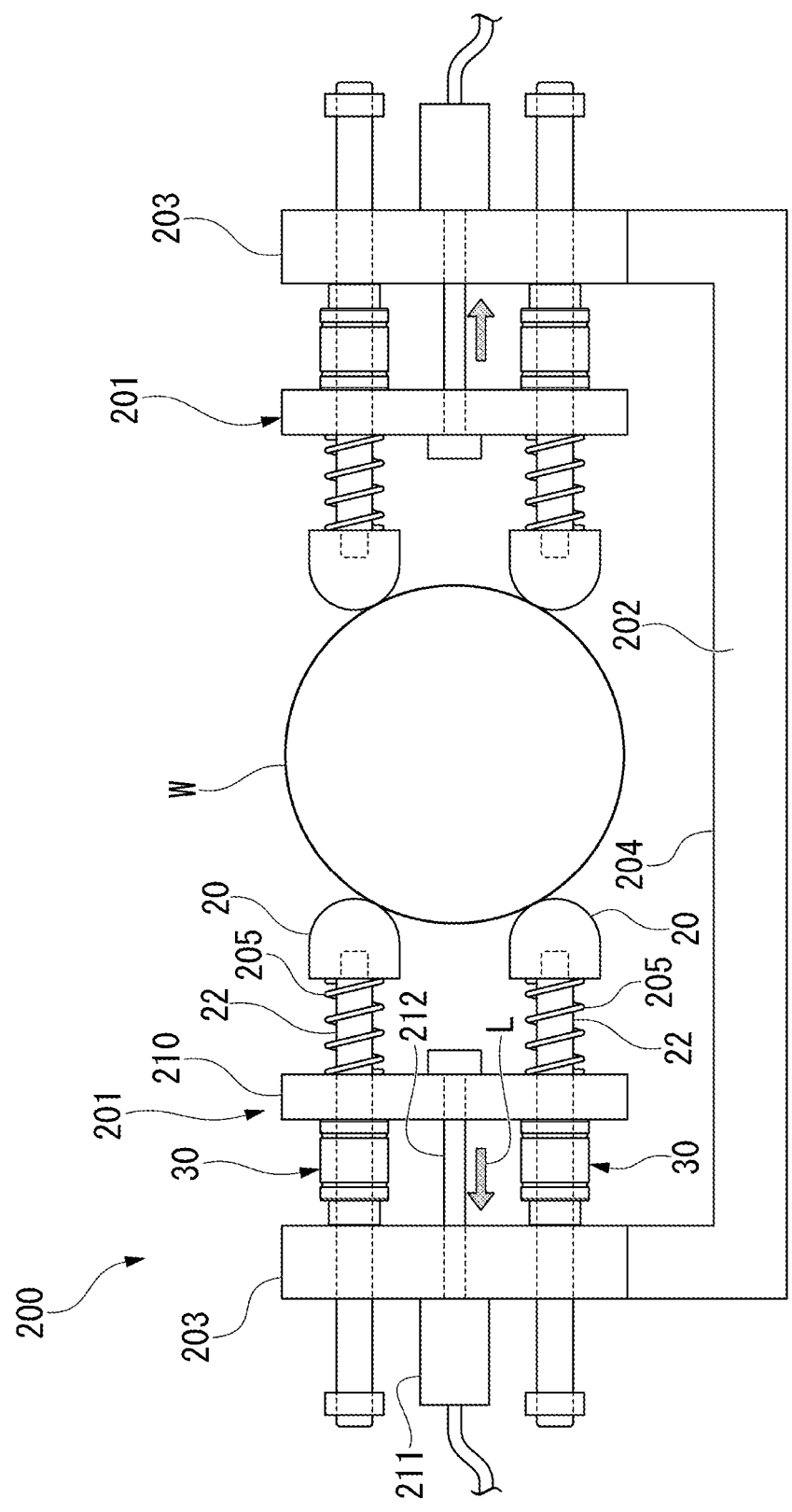
FIG. 18 is a front view showing a three-dimensional vise in a second embodiment of the present invention.

FIG. 18 is a front view showing a three-dimensional vise 200 in the second embodiment of the present invention.

The three-dimensional vise 200 shown in FIG. 18 is a conforming mechanism which includes the plurality of shafts 22 described above and the plurality of displacement-restricting mechanisms 30 and in which the tip ends of the plurality of shafts 22 are caused to conform to a shape of the workpiece W (a sphere in the example shown in FIG. 18). That is, the three-dimensional vise 200 is a kind of the same conforming mechanism as the above-described multi-product pallet 2.

The three-dimensional vise 200 includes a pair of conforming units 201 and a base member 202 that causes the pair of conforming units 201 to face each other with a gap. The base member 202 includes a pair of fixing parts 203 to which the conforming units 201 are fixed and a connecting part 204 that connects the pair of fixing parts 203 to each other. The pair of fixing parts 203 are erected vertically from both end portions of the connecting part 204 in a longitudinal direction. Therefore, the base member 202 is formed in a substantially U shape in a front view.

The conforming unit 201 includes the plurality of shafts 22 and the plurality of displacement-restricting mechanisms 30 described above. Further, the conforming unit 201 includes a movement member 210 for releasing the displacement restriction of the plurality of displacement-restricting mechanisms 30 in the axial direction of the shafts 22. The movement member 210 is formed, for example, in a shape of a rectangular plate. Although not shown, the movement member 210 is guided to be movable with respect to the fixing part 203 of the base member 202 in the axial direction of the shaft 22 through the linear motion guide mechanism 11 and the shaft 41 (see FIG. 4) in the same manner as the above-described connecting mechanism 40 (see FIG. 4).

An actuator 211 is connected to the movement member 210 through an actuator rod 212. The actuator 211 applies a load L to the movement member 210 to release the displacement restriction of the plurality of displacement-restricting mechanisms 30. As the actuator 211, for example, an air cylinder or the like can be exemplified. A spring 205 is arranged between the movement member 210 and the workpiece contact part 20.

When the movement member 210 is moved in the axial direction by the actuator 211 and the displacement restriction of the displacement-restricting mechanism 30 is released, the workpiece contact part 20 (the tip end) comes into contact with the workpiece W due to the pressing by the spring 205. As a result, it is possible to clamp the workpiece W by making the tip ends of the shafts 22 conform to the shape of the workpiece W. After the workpiece W is clamped, the load L applied by the actuator 211 is released, and thus the displacement-restricting mechanism 30 performs the displacement restriction of the shaft 22, and the shape thereof is maintained (fixed).

Figure 19:
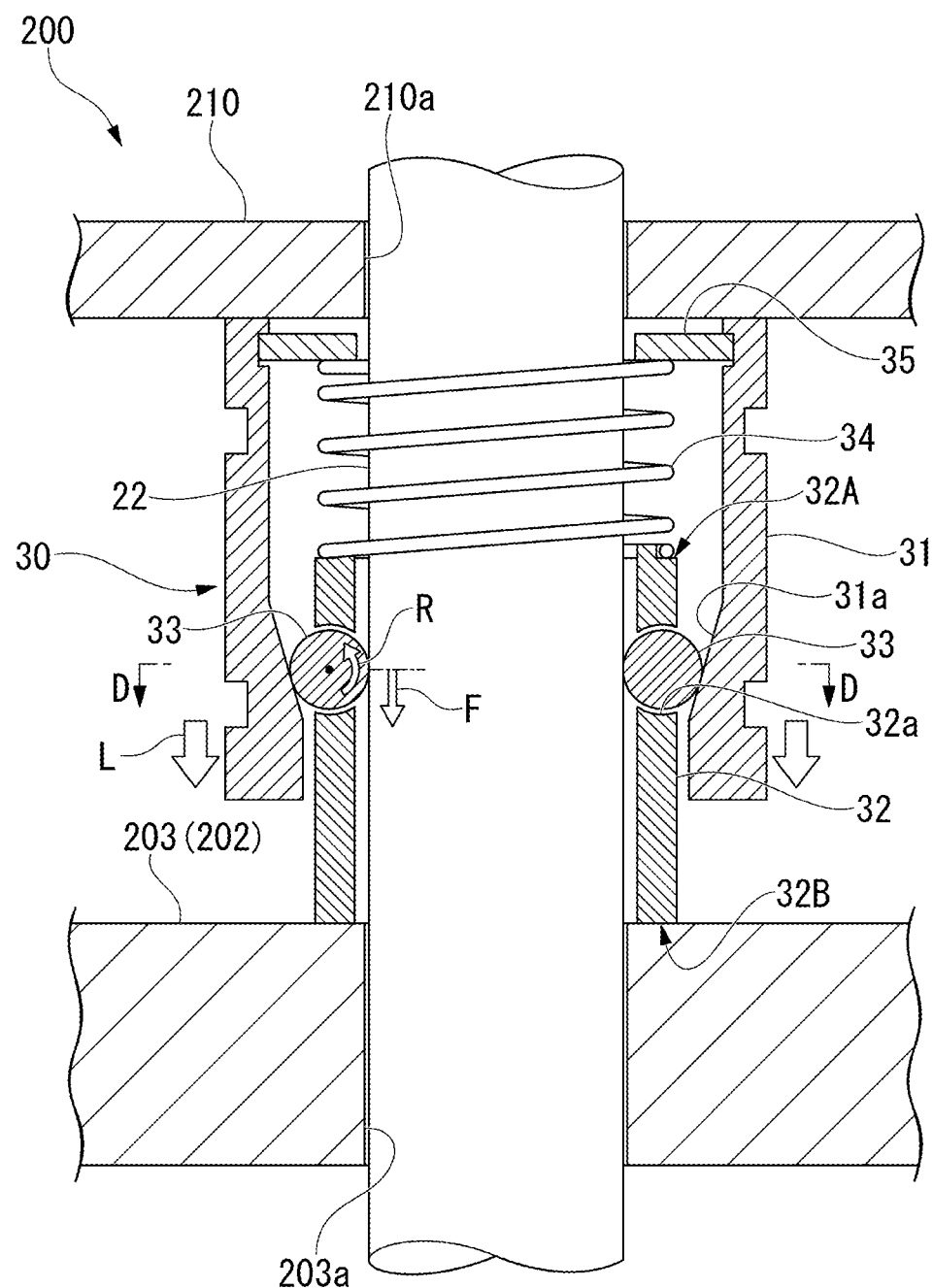
FIG. 19 is a cross-sectional configuration diagram of a displacement-restricting mechanism in the second embodiment of the present invention.
Figure 20:
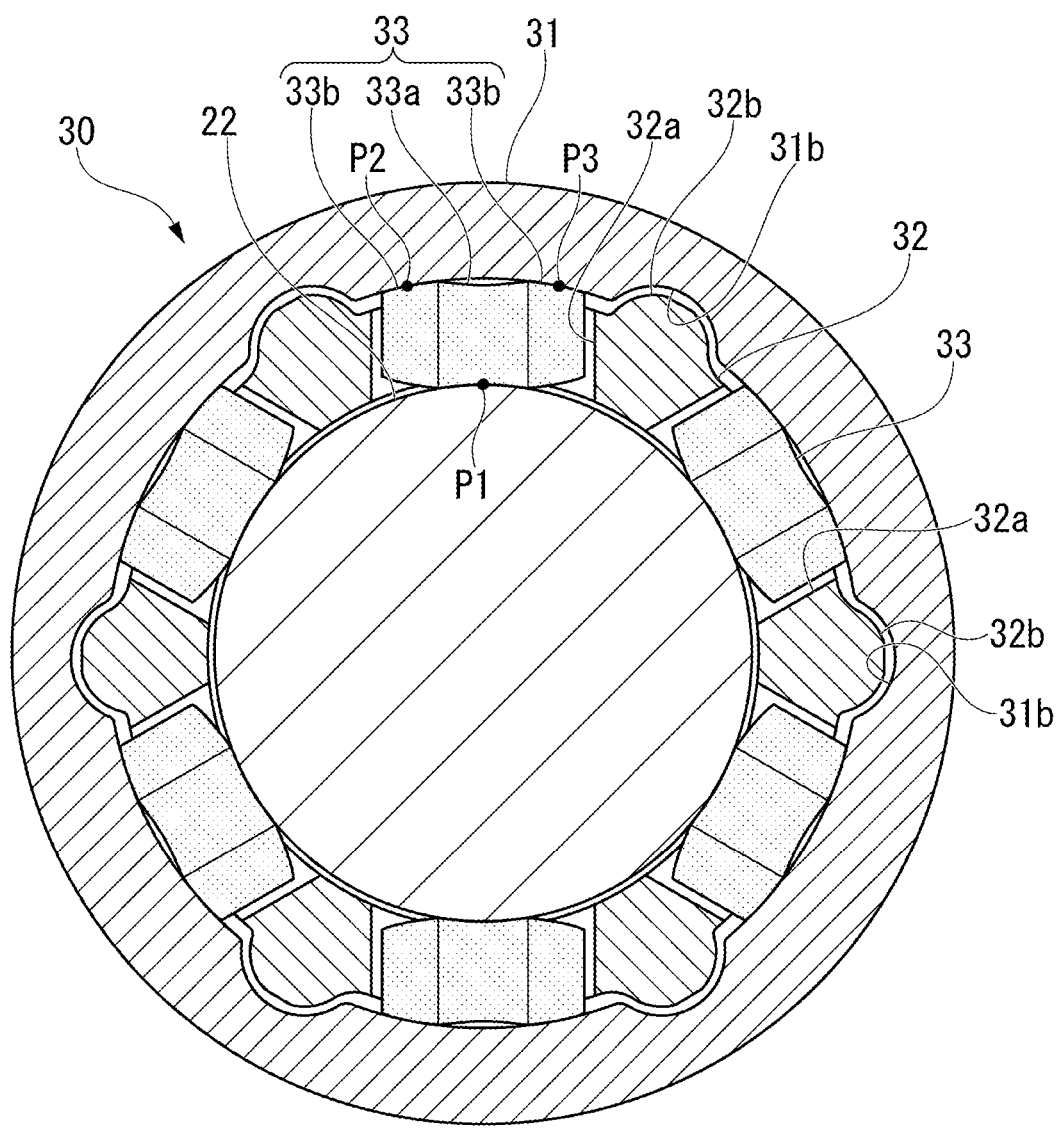
FIG. 20 is a cross-sectional view along line D-D shown in FIG. 19.

FIG. 19 is a cross-sectional configuration diagram of the displacement-restricting mechanism 30 in the second embodiment of the present invention. FIG. 20 is a cross-sectional view along line D-D shown in FIG. 19.

As shown in FIG. 19, the shaft 22 is arranged to be inserted through a through hole 203a formed in the fixing part 203 and a through hole 210a formed in the movement member 210. The displacement-restricting mechanism 30 restricts the displacement of the shaft 22 in an axial direction.

Specifically, the displacement-restricting mechanism 30 includes the outer ring 31 (the outer cylinder) in which the tapered surface 31a is formed on the inner peripheral surface of the outer ring 31 surrounding the peripheral surface of the shaft 22, the inner ring 32 (the inner cylinder) disposed inside the outer ring 31, the rolling body 33 held by the inner ring 32, and the spring 34 (a pressing member) that presses the rolling body 33 toward the tapered surface 31a through the inner ring 32. The plurality of through holes 32a that penetrate the inner ring 32 in a radial direction and hold the rolling bodies 33 are formed in the inner ring 32 at intervals in the circumferential direction.

The tapered surface 31a of the outer ring 31 is reduced in diameter toward the fixing part 203. The outer ring 31 receives the pressing by the spring 34 through the spring receiver 35. As a result, the outer ring 31 comes into contact with the movement member 210 and is movable in the axial direction of the shaft 22 together with the movement member 210. On the other hand, the inner ring 32 comes into contact with the fixing part 203 and is not movable at least in a direction toward the fixing part 203 in the axial direction of the shaft 22. That is, the outer ring 31 is movable relative to the inner ring 32 in the axial direction.

The inner ring 32 includes a step formed at one end portion 32A thereof to receive the end portion of the spring 34. Therefore, the inner ring 32 receives the reaction force of the pressing by the spring 34 and thus is not movable at least in the direction toward the fixing part 203. The other end portion 32B of the inner ring 32 is flat, and the inner ring 32 is movable in the radial direction and the circumferential direction of the shaft 22. That is, the inner ring 32 is in a floating state in which it is slightly movable with respect to the fixing part 203 in the radial direction and the circumferential direction of the shaft 22, although the inner ring 32 is not movable at least in the direction toward the fixing part 203 in the axial direction of the shaft 22. The inner ring 32 may not only be in contact with the fixing part 203 but also be fixed with respect to the fixing part 203 not to be movable. That is, it is sufficient that the outer ring 31 is movable relative to the inner ring 32 in the axial direction in a state in which the inner ring 32 does not move in the axial direction.

As shown in FIG. 20, the rolling body 33 is the above-described gourd shape that can secure a large contact area (a friction area) with the peripheral surface of the shaft 22. Specifically, the rolling body 33 includes a first arc peripheral surface 33a in contact with the peripheral surface of the shaft 22 and second arc peripheral surfaces 33b which are disposed on both sides of the first arc peripheral surface 33a and are in contact with the inner peripheral surface of the outer ring 31. As a result, the rolling body 33 can come into contact with both the shaft 22 and the outer ring 31 at a contact point P1 with respect to the shaft 22 and two contact points P2 and P3 with respect to the outer ring 31. The load applied to the rolling body 33 is evenly distributed by these three contact points P1 to P3.

A guide groove portion 31b recessed in the radial direction is formed in the inner peripheral surface of the outer ring 31. On the other hand, a guide protrusion portion 32b protruding in the radial direction is formed on an outer peripheral surface of the inner ring 32. The guide groove portion 31b and the guide protrusion portion 32b are engaged with each other to be relatively movable in the axial direction of the shaft 22. A predetermined gap is formed between the guide groove portion 31b and the guide protrusion portion 32b in the radial direction and the circumferential direction of the shaft 22, and the inner ring 32 is slightly movable with respect to the outer ring 31 in the radial direction and the circumferential direction.

According to the displacement-restricting mechanism 30 having the above configuration, as shown in FIG. 19, due to the pressing by the spring 34, the rolling body 33 held by the inner ring 32 enters a wedge-shaped space formed between the peripheral surface of the shaft 22 and the tapered surface 31a of the outer ring 31. Then, the rolling body 33 functions as a wedge, and the displacement of the shaft 22 in the axial direction is restricted. On the other hand, in a case in which the displacement restriction is released, the load L is applied to the outer ring 31 through the movement member 210 to move the outer ring 31 in the axial direction (toward the fixing part 203) with respect to the inner ring 32.

Since the inner ring 32 is in contact with the fixing part 203 and does not move in the axial direction, the rolling body 33 hardly moves in the axial direction and rotates at that position (indicated by reference sign R). The rotation of the rolling body 33 occurs by sliding (slipping) with respect to the shaft 22. Therefore, a load roughly equal to or greater than a frictional force F between the shaft 22 and the rolling body 33 only has to be secured as the load L required to release the displacement restriction of the shaft 22.

Figure 21:
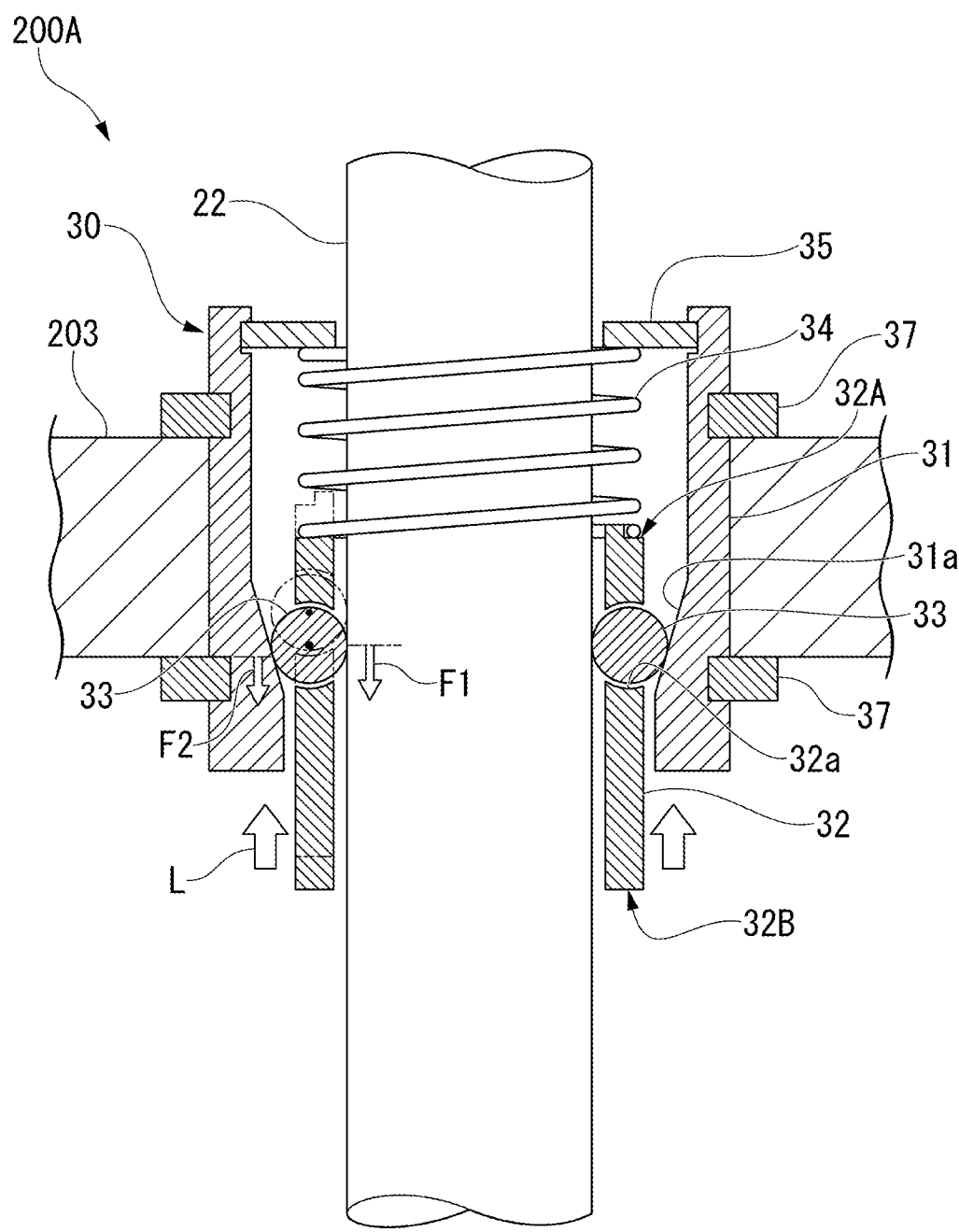
FIG. 21 is a cross-sectional configuration diagram of a displacement-restricting mechanism in which an outer ring 31 is fixed in an axial direction as a comparative example.

FIG. 21 is a cross-sectional configuration diagram of the displacement-restricting mechanism 30 in which the outer ring 31 is fixed in the axial direction as a comparative example.

As shown in FIG. 21, the outer ring 31 is fixed to the fixing part 203 through a fixing ring 37. In this case, the load L required to release the displacement restriction of the shaft 22 becomes large.

Specifically, in a case of a configuration shown in FIG. 21, the inner ring 32 is moved in the axial direction (toward the fixing part 203) with respect to the outer ring 31. Since the outer ring 31 is fixed to the fixing part 203 in the axial direction, the rolling body 33 moves in the axial direction together with the inner ring 32 and hardly rotates. Therefore, a load roughly equal to or more than the sum of a frictional force F1 between the shaft 22 and the rolling body 33 and a frictional force F2 between the outer ring 31 and the rolling body 33 has to be secured as the load L required to release the displacement restriction of the shaft 22.

In the above-described three-dimensional vise 200 (the same applies to the multi-product pallet 2 described in the first embodiment), it is efficient to release the displacement restriction of the plurality of displacement-restricting mechanisms 30 at the same time, and thus it is preferable that the load L required for the releasing be small. Therefore, as compared with in the configuration in which the outer ring 31 is fixed to the fixing part 203 and the outer ring 31 does not move in the axial direction as shown in FIG. 21, in the configuration in which the inner ring 32 does not move in the axial direction as shown in FIG. 19, the load L required to release the displacement restriction of the shaft 22 can be reduced. As a result, the actuator 211 for releasing the displacement restriction of the shaft 22 (the same applies to the pallet displacement restriction-releasing unit 80 described in the first embodiment) can be miniaturized.

As described above, according to the second embodiment described above, the displacement-restricting mechanism 30 for restricting the displacement of the shaft 22 in the axial direction includes the outer ring 31 in which the tapered surface 31a is formed on the inner peripheral surface of the outer ring 31 surrounding the peripheral surface of the shaft 22, the inner ring 32 disposed inside the outer ring 31, the rolling body 33 held by the inner ring 32, and the spring 34 that presses the rolling body 33 toward the tapered surface 31a through the inner ring 32, and the outer ring 31 is movable relative to the inner ring 32 in the axial direction in a state in which the inner ring 32 does not move in the axial direction. According to this configuration, it is possible to reduce the load L required to release the displacement restriction of the shaft 22, and it is possible to provide the displacement-restricting mechanism 30 suitable for the conforming mechanism, such as the three-dimensional vise 200 (the same applies to the multi-product pallet 2).

Further, in the above configuration, as shown in FIG. 19, the inner ring 32 receives the load L in the axial direction received by the outer ring 31. Such an inner ring 32 may be formed of lightweight and high-strength fiber reinforced plastic (FRP), a metal, or the like.

Further, the inner ring 32 is movable in the radial direction and the circumferential direction of the shaft 22. According to this configuration, the inner ring 32 is in a floating state in which it is movable with respect to the fixing part 203 in the radial direction and the circumferential direction of the shaft 22, although the inner ring 32 is not movable with respect to the fixing part 203 in the axial direction of the shaft 22. Therefore, the plurality of rolling bodies 33 shown in FIG. 20 freely move in the radial direction and the circumferential direction of the shaft 22 and easily enter the wedge space evenly. Accordingly, an unbalanced load is unlikely to be applied to the inner ring 32, and the load bearing capacity of the inner ring 32 can be improved.

Further, in the present embodiment, as shown in FIG. 18, the movement member 210 that simultaneously moves at least some of the outer rings 31 (in each conforming unit 201) included in the plurality of displacement-restricting mechanisms 30 relative to the inner rings 32 in the axial direction is provided. According to this configuration, since the load L for releasing the displacement restriction of each displacement-restricting mechanism 30 is small, it is possible to simultaneously release the displacement restriction of the plurality of displacement-restricting mechanisms 30 through the movement member 210.

Although preferred embodiments of the present invention have been described above with reference to the drawings, the present invention is not limited to the above embodiments. The various shapes and combinations of the constituent members shown in the above-described embodiment are examples and can be variously changed based on design requirements and the like within the scope of the present invention.

For example, in the first embodiment, the configuration in which the workpiece is supported by the multi-product pallet 2 has been described, however, for example, the workpiece may be attracted to the multi-product pallet 2 (the workpiece contact part 20) to suspend the workpiece from the ceiling. Further, for example, the workpiece may be sandwiched from the left and right by a set of multi-product pallets 2 and may be used like the three-dimensional vise of the second embodiment.

Further, for example, in the first embodiment, the configuration in which the workpiece contact parts 20 in each workpiece contact row 21 are displaced using the actuator row 92 in which the same number of the actuators 91 as the workpiece contact parts 20 form a row has been described, however, a configuration in which the workpiece contact parts 20 are displaced one by one using one actuator 91 may be possible although it takes time. The same applies to the second embodiment.

INDUSTRIAL APPLICABILITY

The present invention can be used for a multi-product pallet device and a control system for a multi-product pallet device that are favorable in usability, and a displacement-restricting mechanism and a conforming mechanism that are suitable for these.

DESCRIPTION OF REFERENCE NUMERAL

1 Multi-product pallet device
2 Multi-product pallet (conforming mechanism)

3 Device main body
10 Pallet main body
20 Workpiece contact part
21 Workpiece contact row
30 Displacement-restricting mechanism
31 Outer ring (outer cylinder)
31a Tapered surface
32 Inner ring (inner cylinder)
33 Rolling body
34 Spring (pressing member)
40 Connecting mechanism (movement member)
50 Pallet transport unit
80 Pallet displacement restriction-releasing unit
91 Actuator
92 Actuator row
95 Drive unit
96 Driver
100 Control system
101 Shape restoration data-generating device
200 Three-dimensional vise (conforming mechanism)
203 Fixing part
210 Movement member

The invention claimed is:

1. A conforming mechanism comprising:
a plurality of shafts; and
a plurality of displacement-restricting mechanisms which restrict displacement of the plurality of shafts in an axial direction,
wherein tip ends of the plurality of shafts are caused to conform to a shape of a workpiece,
wherein each of the plurality of displacement-restricting mechanisms includes:
an outer cylinder in which a tapered surface is formed on an inner peripheral surface of the outer cylinder surrounding a peripheral surface of the shaft;
an inner cylinder disposed inside the outer cylinder;
a rolling body held by the inner cylinder; and
a pressing member that presses the rolling body toward the tapered surface through the inner cylinder,
wherein the outer cylinder is movable relative to the inner cylinder in the axial direction in a state in which the inner cylinder does not move in the axial direction,
wherein the conforming mechanism further comprises a conforming unit and a base member,
wherein the base member includes a fixing part to which the conforming unit is fixed,
wherein the conforming unit includes the plurality of shafts and the plurality of displacement-restricting mechanisms,
wherein the tapered surface of the outer cylinder is reduced in diameter toward the fixing part,
wherein the inner cylinder comes into contact with the fixing part and is not movable in a direction toward the fixing part in the axial direction of the shaft,
wherein, due to a pressing by the pressing member, the rolling body held by the inner cylinder enters a wedge-shaped space formed between the peripheral surface of the shaft and the tapered surface of the outer cylinder, and then, the rolling body functions as a wedge, and the displacement of the shaft in the axial direction is restricted, and
wherein a load is applied to the outer cylinder to move the outer cylinder in the axial direction with respect to the inner cylinder, rotate the rolling body, and release a displacement restriction of the shaft in the axial direction.

2. The conforming mechanism according to claim 1, wherein the inner cylinder receives the load in the axial direction applied to the outer cylinder.

3. The conforming mechanism according to claim 1, wherein the inner cylinder is movable in a radial direction and a circumferential direction of the shaft.

4. The conforming mechanism according to claim 1, further comprising a movement member which simultaneously moves any number of a plurality of the outer cylinders included in the plurality of displacement-restricting mechanisms relative to a plurality of the inner cylinders in the axial direction.

* * * * *